(12) United States Patent
Bader

(10) Patent No.: US 9,751,777 B1
(45) Date of Patent: *Sep. 5, 2017

(54) TREATMENT OF PRODUCED WATER FROM UNCONVENTIONAL HYDROCARBONS EXPLORATION

(71) Applicant: Mansour S. Bader, College Station, TX (US)

(72) Inventor: Mansour S. Bader, College Station, TX (US)

(*) Notice: Subject to any disclaimer, the term of this patent is extended or adjusted under 35 U.S.C. 154(b) by 293 days.

This patent is subject to a terminal disclaimer.

(21) Appl. No.: 14/545,681

(22) Filed: Jun. 6, 2015

Related U.S. Application Data

(63) Continuation-in-part of application No. 14/544,436, filed on Jan. 6, 2015, which is a continuation-in-part of application No. 14/544,317, filed on Dec. 22, 2014, which is a continuation-in-part of application No. 13/066,841, filed on Apr. 26, 2011, now Pat. No. 8,915,301.

(51) Int. Cl.
| | |
|---|---|
| *B01D 15/04* | (2006.01) |
| *C02F 1/40* | (2006.01) |
| *C02F 1/52* | (2006.01) |
| *C02F 101/32* | (2006.01) |
| *C02F 101/10* | (2006.01) |
| *B01D 15/08* | (2006.01) |

(52) U.S. Cl.
CPC ............. *C02F 1/40* (2013.01); *C02F 1/5254* (2013.01); *B01D 15/08* (2013.01); *C02F 2101/10* (2013.01); *C02F 2101/32* (2013.01)

(58) Field of Classification Search
USPC .................. 210/638; 95/92; 202/152
See application file for complete search history.

(56) References Cited

U.S. PATENT DOCUMENTS

| | | | | |
|---|---|---|---|---|
| 5,403,483 A * | 4/1995 | Hayashida | ........... | B01D 39/083 210/490 |
| 7,093,663 B1 * | 8/2006 | Bader | ................ | B01D 61/147 166/279 |
| 7,392,848 B1 * | 7/2008 | Bader | ................ | B01D 61/025 166/279 |
| 7,789,159 B1 * | 9/2010 | Bader | .................. | B01D 61/04 166/279 |
| 7,934,551 B1 | 5/2011 | Bader | | |
| 7,963,338 B1 * | 6/2011 | Bader | ................ | B01D 61/364 166/279 |
| 8,197,696 B1 | 6/2012 | Bader | | |
| 8,915,301 B1 * | 12/2014 | Bader | .................... | C02F 9/00 166/279 |
| 8,961,916 B1 | 2/2015 | Bader | | |

(Continued)

*Primary Examiner* — Nina Bhat

(57) ABSTRACT

Unconventional hydrocarbons production from shale and tight-sand formations unlocks vast new energy sources to the nation. However, public perception about excessive potable water use in hydro-fracturing and possible pollution routes in discharging and reusing produced water (flow-back water) promotes state's stringent regulations and opens the door to develop effective produced water treatment methods. This invention is therefore aimed at properly treating produced water to avert health and environmental liabilities and convert economic losses to useful by-products using innovative methods to de-oil, de-scale, and de-salt produced water.

34 Claims, 4 Drawing Sheets

(56) References Cited

U.S. PATENT DOCUMENTS

| | | | | |
|---|---|---|---|---|
| 2009/0277797 A1* | 11/2009 | Pruet | ........................ | B03C 9/00 |
| | | | | 205/162 |
| 2012/0208247 A1* | 8/2012 | Kipp | ..................... | B01D 63/02 |
| | | | | 435/134 |
| 2013/0270187 A1* | 10/2013 | Seibert | ................... | B01D 63/02 |
| | | | | 210/644 |
| 2014/0008271 A1* | 1/2014 | Moene | ............... | B01D 17/0214 |
| | | | | 208/188 |

* cited by examiner

TREATMENT OF PRODUCED WATER FROM UNCONVENTIONAL HYDROCARBONS EXPLORATION

BACKGROUND OF THE INVENTION

Unconventional hydrocarbons production from low-permeability organic-rich shale and tight-sand formations is rapidly expanding. It opens vast new energy sources to the nation. Gas productions in 2012 from shale and tight-sand formations were, respectively, accounting for 34% and 24% of the nation's total gas production. Unconventional gas production is currently dominant in Marcellus Basin (29%), Haynesville Basin (23%), Barnett Basin (17%), and the remaining 31% is contributed by about 20 other basins. Future forecasts indicate that unconventional gas production will double by 2035 whereas unconventional oil production will increase by about 15%.

However, unconventional hydrocarbons exploration may impose adverse health and environmental long-term effects. In shale and tight-sand exploration, a fluid is used to fracture and stimulate the formation. This fluid is referred to as fracturing fluid or completion fluid. Fracturing fluid is typically potable water mixed with a large number of additives, and some of which are toxic chemicals. The average required volume of fracturing fluid is about 40,000 barrels for a vertical well and 100,000 barrels for a horizontal well.

The fluid that flows back during and after fracturing is often denoted flow-back water (FBW) or produced water (PW). However, it is referred to in this invention as PW. A portion of the fracturing fluid (e.g., 20-45%) flows back to the surface as PW, and the flow of PW substantially decreases with time to near halation at the well completion (30-90 days). During fracturing, ions including transition metals, scale-prone species, and Naturally Occurring Radioactive Materials (NORM) within formation layers are dissolved, mixed with high salinity formation water, and mobilized to the surface with PW. As such, ions concentrations in PW sharply increase with time; the longer the downhole residence time, the higher their concentrations in PW. Table 1 [Haluszczak, L. O., et al., Applied Geochemistry, 2013, 28, pp. 55-61] and Table 2 [Hayes, T. and Severin, B. F., RPSEA Final Report #08122-05, 2012] present, for example, some samples of PW at 10-14 days from, respectively, Marcellus and Barnett basins. Alkaline cations (magnesium, calcium, strontium, barium and radium), particularly radium radioactive isotopes, along with bromide are signatures for such PW.

Even though the 2005 Energy Policy Act exempts fracturing operations from the Safe Drinking Water Act (SDWA) with one exception (injection of diesel) to the exemption, hydro-fracturing is faced with surmounted predicaments driven by negative public perception. First, health and environmental regulations, monitoring, and enforcement for various contaminants by individual states are continually evolving, which are focused on the disclosure of the constituents in fracturing fluids and in PW for both discharge and reuse. One of the critical moves is the development of appropriate analytical methods, particularly for radioactivity, to replace the "drift" of using existing analytical procedures that may not be applicable to such PW and tend to underestimate the levels of some critical contaminants.

Second, the magnitude of PW is overwhelming. For example, PW from Marcellus basin was over 31 million barrels in 2014 alone. It indicates the least potable water dependency, if not overuse or depletion of potable water resources that may compete with other uses especially in water distressed areas.

Third, the toxic-nature of fracturing fluid as well as the possible toxic-radioactive nature of PW are alarming. The journey of fracturing fluid from the surface to downhole formation and back to the surface may contaminate shallow water aquifers via geological connectivity and leakage from fracturing fluid, produced hydrocarbons, PW, and PW holding ponds.

Fourth, the common method to avoid PW treatment is disposal in deep wells. However, the demand for disposal in deep wells has increased due to the high volume of PW. Thus, disposal in deep wells becomes very limited or may not be cheaply and readily available for producers in some states (e.g., Pennsylvania). In addition, the potential environmental risks of contaminating water aquifers (e.g., integrity failure of disposal wells, leakage from improper lining, etc.) as well as geological risks of potentially inducing seismicity and earthquakes are high. The costs of PW long distance hauling and disposal in deep wells therefore become relatively expensive for producers in some states. For example, the costs of trucking PW from Pennsylvania to a neighboring state and disposing of PW may be in the range of $10-$15 per barrel.

Fifth, the above mentioned factors open the door for promoting and developing innovative methods to properly treat and reuse PW. However, it appears that the predominant theme so far in treating PW is dilution, but dilution is not a solution to pollution. Incomplete treatment of PW; especially when the content of PW is released in both solid and liquid forms into landfills, possible public roads as a de-icing salt, conventional wastewater treatment facilities, surface waters; spreads contaminants wider and further even if the release of contaminants is within regulations. In establishing a proper PW treatment, no more logical approach seemed to present itself than the direct and selective isolation of radioactivity, scale prone species, and other critical species.

THE OBJECTIVES OF THE INVENTION

The objective of this invention is to properly treat PW to avert health and environmental liabilities and convert economic losses to useful by-products using innovative de-oiling, de-scaling and de-salting methods. De-oiling is aimed at separating oil content and other organics from PW prior to de-scaling and de-salting to prevent their interference as: (1) viscous species with solids filtration and de-watering; and (2) foulant species with the performance of thermal- or pressure-driven de-salting. De-scaling is aimed at separating alkaline cations (radium, barium, strontium, magnesium, and calcium) in multi-stages or a single-stage precipitation to isolate radioactivity (radium-barium), recover most or all of the remaining nonradioactive alkaline cations (magnesium, calcium and strontium), and make PW amenable to de-salting. A further benefit of de-scaling is the separation of critical species such as transition metals (e.g., iron and manganese) and bromide from PW. De-salting is aimed at the recovery water distillate, and if desired, the production of a salt (sodium-calcium chloride or sodium chloride).

SUMMARY OF THE INVENTION

In one aspect, the present invention provides a method to de-oil, de-scale and de-salt produced water. The inventive method comprises the steps of: (a) separating oil from produced water by hydrophobic membranes to produce de-oiled produced water; (b) separating radium and barium in the form of sulfates from the de-oiled produced water to produce a first intermediate de-scaled produced water; (c) separating magnesium in the form of hydroxide from the first intermediate de-scaled produced water to produce a second intermediate de-scaled produced water; (d) separating strontium in the form of hydroxide from the second intermediate de-scaled produced water to produce de-scaled produced water; (e) recovering at least most of the amine solvent from the de-scaled produced water by a stripping unit to produce de-aerated produced water; (f) using the de-aerated produced water for hydro-fracturing; or (g) blending the de-aerated produced water with low salinity water to produce a blend stream for hydro-fracturing; or (h) partially de-salting the de-aerated produced water by a desalination method to produce water distillate and concentrate produced water; or (i) further de-salting the concentrate produced water by a thermal crystallizer to produce further water distillate and sodium-calcium chloride salt; or (j) further de-salting the concentrate produced water to produce sodium-calcium chloride salt and decanted produced water. Radium and barium are separated in the form of sulfates in step (b) by: (i) mixing the de-oiled produced water with an amine solvent and magnesium sulfate or sulfate-rich mine drainage water to form precipitates comprising radium and barium in the form of sulfates in a first precipitator unit; and (ii) removing precipitates from the de-oiled produced water, and recovering at least most of the remaining amine solvent from precipitates by a first filter equipped to recover the amine solvent, to produce the first intermediate de-scaled produced water. Magnesium is separated in the form of hydroxide in step (c) by: (i) mixing the first intermediate de-scaled produced water with the amine solvent to form precipitates comprising magnesium in the form of hydroxide in a second precipitator unit; and (ii) removing precipitates from the first intermediate de-scaled produced water, and recovering at least most of the remaining amine solvent from precipitates by a second filter equipped to recover the amine solvent, to produce the second intermediate de-scaled produced water. Strontium is separated in the form of hydroxide in step (d) by: (i) mixing the second intermediate de-scaled produced water with a humic acid to form precipitates comprising strontium in the form of hydroxide in a third precipitator unit; and (ii) removing precipitates from the second intermediate de-scaled produced water, and recovering at least most of the remaining amine solvent from precipitates by a third filter equipped to recover the amine solvent, to produce de-scaled produced water. The concentrate produced water is further de-salted in step (j) by: (i) mixing the concentrate produced water with the amine solvent to form precipitates comprising sodium-calcium chloride salt in a fourth precipitator unit; (ii) removing precipitates from the concentrate produced water, and recovering at least most of the remaining amine solvent from precipitates by a fourth filter equipped to recover the amine solvent, to produce decanted produced water; and (iii) recycling the decanted produced water by blending with the de-scaled produced water from step (d) and feeding the blend stream to the stripping unit in step (e).

In another aspect, the present invention provides a method to de-oil, de-scale and de-salt produced water. The inventive method comprises the steps of: (a) separating oil from produced water by hydrophobic membranes to produce de-oiled produced water; (b) separating radium and barium in the form of sulfates from the de-oiled produced water to produce a first intermediate de-scaled produced water; (c) separating magnesium in the form of hydroxide from the first intermediate de-scaled produced water to produce a second intermediate de-scaled produced water; (d) separating calcium in the form of carbonate from the second intermediate de-scaled produced water to produce de-scaled produced water; (e) recovering at least most of the amine solvent from the de-scaled produced water by a stripping unit to produce de-aerated produced water; (f) using the de-aerated produced water for hydro-fracturing; or (g) blending the de-aerated produced water with low salinity water to produce a blend stream for hydro-fracturing; or (h) partially de-salting the de-aerated produced water by a desalination method to produce water distillate and concentrate produced water; or (i) further de-salting the concentrate produced water by a thermal crystallizer to produce further water distillate and sodium chloride salt; or (j) further de-salting the concentrate produced water to produce sodium chloride salt and decanted produced water. Radium and barium are separated in the form of sulfates in step (b) by: (i) mixing the de-oiled produced water with an amine solvent and magnesium sulfate or sulfate-rich mine drainage water to form precipitates comprising radium and barium in the form of sulfates in a first precipitator unit; and (ii) removing precipitates from the de-oiled produced water, and recovering at least most of the remaining amine solvent from precipitates by a first filter equipped to recover the amine solvent, to produce the first intermediate de-scaled produced water. Magnesium is separated in the form of hydroxide in step (c) by: (i) mixing the first intermediate de-scaled produced water with the amine solvent to form precipitates comprising magnesium in the form of hydroxide in a second precipitator unit; and (ii) removing precipitates from the first intermediate de-scaled produced water, and recovering at least most of the remaining amine solvent from precipitates by a second filter equipped to recover the amine solvent, to produce the second intermediate de-scaled produced water. Calcium is separated in the form of carbonate in step (d) by: (i) mixing the second intermediate de-scaled produced water with sodium carbonate or a carbonate source to form precipitates comprising calcium in the form of carbonate in a third precipitator unit; and (ii) removing precipitates from the second intermediate de-scaled produced water, and recovering at least most of the remaining amine solvent from precipitates by a third filter equipped to recover the amine solvent, to produce de-scaled produced water. The concentrate produced water is further de-salted in step (j) by: (i) mixing the concentrate produced water with the amine solvent to form precipitates comprising sodium chloride salt in a fourth precipitator unit; (ii) removing precipitates from the concentrate produced water, and recovering at least most of the remaining amine solvent from precipitates by a fourth filter equipped to recover the amine solvent, to produce decanted produced water; and (iii) recycling the decanted produced water by blending with the de-scaled produced water from step (d) and feeding the blend stream to the stripping unit in step (e).

In yet another aspect, the present invention provides a method to de-oil, de-scale and de-salt produced water. The inventive method comprises the steps of: (a) separating oil from produced water by hydrophobic membranes to produce de-oiled produced water; (b) separating radium and barium in the form of sulfates from the de-oiled produced water to produce a first intermediate de-scaled produced water; (c) separating magnesium in the form of hydroxide from the first intermediate de-scaled produced water to produce a second intermediate de-scaled produced water; (d) separating calcium in the form of chloroaluminate or chloroferrate from the second intermediate de-scaled produced water to produce de-scaled produced water; (e) recovering at least most of the amine solvent from the de-scaled produced water by a stripping unit to produce de-aerated produced water; (f) using the de-aerated produced water for hydro-fracturing; or (g) blending the de-aerated produced water with low salinity water to produce a blend stream for hydro-fracturing; or (h) partially de-salting the de-aerated produced water by a desalination method to produce water distillate and concentrate produced water; or (i) further de-salting the concentrate produced water by a thermal crystallizer to produce further water distillate and sodium chloride salt; or (j) further de-salting the concentrate produced water to produce sodium chloride salt and decanted produced water. Radium and barium are separated in the form of sulfates in step (b) by: (i) mixing the de-oiled produced water with an amine solvent and magnesium sulfate or sulfate-rich mine drainage water to form precipitates comprising radium and barium in the form of sulfates in a first precipitator unit; and (ii) removing precipitates from the de-oiled produced water, and recovering at least most of the remaining amine solvent from precipitates by a first filter equipped to recover the amine solvent, to produce the first intermediate de-scaled produced water. Magnesium is separated in the form of hydroxide in step (c) by: (i) mixing the first intermediate de-scaled produced water with the amine solvent to form precipitates comprising magnesium in the form of hydroxide in a second precipitator unit; and (ii) removing precipitates from the first intermediate de-scaled produced water, and recovering at least most of the remaining amine solvent from precipitates by a second filter equipped to recover the amine solvent, to produce the second intermediate de-scaled produced water. Calcium is separated in the form of chloroaluminate or chloroferrate in step (d) by: (i) mixing the second intermediate de-scaled produced water with the amine solvent and a source of aluminum or iron to form precipitates comprising calcium in the form of chloroaluminate or chloroferrate in a third precipitator unit; and (ii) removing precipitates from the second intermediate de-scaled produced water, and recovering at least most of the remaining amine solvent from precipitates by a third filter equipped to recover the amine solvent, to produce de-scaled produced water. The concentrate produced water is further de-salted in step (j) by: (i) mixing the concentrate produced water with the amine solvent to form precipitates comprising sodium chloride salt in a fourth precipitator unit; (ii) removing precipitates from the concentrate produced water, and recovering at least most of the remaining amine solvent from precipitates by a fourth filter equipped to recover the amine solvent, to produce decanted produced water; and (iii) recycling the decanted produced water by blending with the de-scaled produced water from step (d) and feeding the blend stream to the stripping unit in step (e).

In yet another aspect, the present invention provides a method to de-oil, de-scale and de-salt produced water. The inventive method comprises the steps of: (a) separating oil from produced water by hydrophobic membranes to produce de-oiled produced water; (b) separating radium and barium in the form of sulfates from the de-oiled produced water to produce a first intermediate de-scaled produced water; (c) separating magnesium in the form of hydroxide from the first intermediate de-scaled produced water to produce a second intermediate de-scaled produced water; (d) separating calcium in the form of sulfoaluminate or sulfoferrate from the second intermediate de-scaled produced water to produce de-scaled produced water; (e) recovering at least most of the amine solvent from the de-scaled produced water by a stripping unit to produce de-aerated produced water; (f) using the de-aerated produced water for hydro-fracturing; or (g) blending the de-aerated produced water with low salinity water to produce a blend stream for hydro-fracturing; or (h) partially de-salting the de-aerated produced water by a desalination method to produce water distillate and concentrate produced water; or (i) further de-salting the concentrate produced water by a thermal crystallizer to produce further water distillate and sodium chloride salt; or (j) further de-salting the concentrate produced water to produce sodium chloride salt and decanted produced water. Radium and barium are separated in the form of sulfates in step (b) by: (i) mixing the de-oiled produced water with an amine solvent and magnesium sulfate or sulfate-rich mine drainage water to form precipitates comprising radium and barium in the form of sulfates in a first precipitator unit; and (ii) removing precipitates from the de-oiled produced water, and recovering at least most of the remaining amine solvent from precipitates by a first filter equipped to recover the amine solvent, to produce the first intermediate de-scaled produced water. Magnesium is separated in the form of hydroxide in step (c) by: (i) mixing the first intermediate de-scaled produced water with the amine solvent to form precipitates comprising magnesium in the form of hydroxide in a second precipitator unit; and (ii) removing precipitates from the first intermediate de-scaled produced water, and recovering at least most of the remaining amine solvent from precipitates by a second filter equipped to recover the amine solvent, to produce the second intermediate de-scaled produced water. Calcium is separated in the form of sulfoaluminate or sulfoferrate in step (d) by: (i) mixing the second intermediate de-scaled produced water with the sulfate-rich mine drainage water, a source of aluminum or iron, and the amine solvent to form precipitates comprising calcium in the form of sulfoaluminate or sulfoferrate in a third precipitator unit; and (ii) removing precipitates from the second intermediate de-scaled produced water, and recovering at least most of the remaining amine solvent from precipitates by a third filter equipped to recover the amine solvent, to produce de-scaled produced water. The concentrate produced water is further de-salted in step (j) by: (i) mixing the concentrate produced water with the amine solvent to form precipitates comprising sodium chloride salt in a fourth precipitator unit; (ii) removing precipitates from the concentrate produced water, and recovering at least most of the remaining amine solvent from precipitates by a fourth filter equipped to recover the amine solvent, to produce decanted produced water; and (iii) recycling the decanted produced water by blending with the de-scaled produced water from step (d) and feeding the blend stream to the stripping unit in step (e).

In yet another aspect, the present invention provides a method to de-oil, de-scale and de-salt produced water. The inventive method comprises the steps of: (a) separating oil from produced water by hydrophobic membranes to produce de-oiled produced water; (b) separating magnesium in the form of hydroxide from the de-oiled produced water to produce a first intermediate de-scaled produced water; (c) separating calcium in the form of chloroaluminate or chloroferrate from the first intermediate de-scaled produced water to produce a second intermediate de-scaled produced water; (d) separating radium and barium in the form of sulfates from the second intermediate de-scaled produced water to produce de-scaled produced water; (e) recovering at least most of the amine solvent from the de-scaled produced water by a stripping unit to produce de-aerated produced water; (f) using the de-aerated produced water for hydro-fracturing; or (g) blending the de-aerated produced water with low salinity water to produce a blend stream for hydro-fracturing; or (h) partially de-salting the de-aerated produced water by a desalination method to produce water distillate and concentrate produced water; or (i) further de-salting the concentrate produced water by a thermal crystallizer to produce further water distillate and sodium chloride salt; or (j) further de-salting the concentrate produced water to produce sodium chloride salt and decanted produced water. Magnesium is separated in the form of hydroxide in step (b) by: (i) mixing the de-oiled produced water with the amine solvent to form precipitates comprising magnesium in the form of hydroxide in a first precipitator unit; and (ii) removing precipitates from the de-oiled produced water, and recovering at least most of the remaining amine solvent from precipitates by a first filter equipped to recover the amine solvent, to produce the first intermediate de-scaled produced water. Calcium is separated in the form of chloroaluminate or chloroferrate in step (c) by: (i) mixing the first intermediate de-scaled produced water with the amine solvent and a source of aluminum or iron to form precipitates comprising calcium in the form of chloroaluminate or chloroferrate in a second precipitator unit; and (ii) removing precipitates from the first intermediate de-scaled produced water, and recovering at least most of the remaining amine solvent from precipitates by a second filter equipped to recover the amine solvent, to produce the second intermediate de-scaled produced water. Radium and barium are separated in the form of sulfates in step (d) by: (i) mixing the second intermediate de-scaled produced water with magnesium sulfate or sulfate-rich mine drainage water to form precipitates comprising radium and barium in the form of sulfates in a third precipitator unit; and (ii) removing precipitates from the second intermediate de-scaled produced water, and recovering at least most of the remaining amine solvent from precipitates by a third filter equipped to recover the amine solvent, to produce de-scaled produced water. The concentrate produced water is further de-salted in step (j) by: (i) mixing the concentrate produced water with the amine solvent to form precipitates comprising sodium chloride salt in a fourth precipitator unit; (ii) removing precipitates from the concentrate produced water, and recovering at least most of the remaining amine solvent from precipitates by a fourth filter equipped to recover the amine solvent, to produce decanted produced water; and (iii) recycling the decanted produced water by blending with the de-scaled produced water from step (d) and feeding the blend stream to the stripping unit in step (e).

In yet another aspect, the present invention provides a method to de-oil, de-scale and de-salt produced water. The inventive method comprises the steps of: (a) separating oil from produced water by hydrophobic membranes to produce de-oiled produced water; (b) separating magnesium in the form of hydroxide from the de-oiled produced water to produce a first intermediate de-scaled produced water; (c) separating calcium in the form of chloroaluminate or chloroferrate from the first intermediate de-scaled produced water to produce a second intermediate de-scaled produced water; (d) separating radium and barium in the form of carbonates from the second intermediate de-scaled produced water to produce de-scaled produced water; (e) recovering at least most of the amine solvent from the de-scaled produced water by a stripping unit to produce de-aerated produced water; (f) using the de-aerated produced water for hydro-fracturing; or (g) blending the de-aerated produced water with low salinity water to produce a blend stream for hydro-fracturing; or (h) partially de-salting the de-aerated produced water by a desalination method to produce water distillate and concentrate produced water; or (i) further de-salting the concentrate produced water by a thermal crystallizer to produce further water distillate and sodium chloride salt; or (j) further de-salting the concentrate produced water to produce sodium chloride salt and decanted produced water. Magnesium is separated in the form of hydroxide in step (b) by: (i) mixing the de-oiled produced water with the amine solvent to form precipitates comprising magnesium in the form of hydroxide in a first precipitator unit; and (ii) removing precipitates from the de-oiled produced water, and recovering at least most of the remaining amine solvent from precipitates by a first filter equipped to recover the amine solvent, to produce the first intermediate de-scaled produced water. Calcium is separated in the form of chloroaluminate or chloroferrate in step (c) by: (i) mixing the first intermediate de-scaled produced water with the amine solvent and a source of aluminum or iron to form precipitates comprising calcium in the form of chloroaluminate or chloroferrate in a second precipitator unit; and (ii) removing precipitates from the first intermediate de-scaled produced water, and recovering at least most of the remaining amine solvent from precipitates by a second filter equipped to recover the amine solvent, to produce the second intermediate de-scaled produced water. Radium and barium are separated in the form of carbonates in step (d) by: (i) mixing the second intermediate de-scaled produced water with sodium carbonate or a carbonate source to form precipitates comprising radium and barium in the form of carbonates in a third precipitator unit; and (ii) removing precipitates from the second intermediate de-scaled produced water, and recovering at least most of the remaining amine solvent from precipitates by a third filter equipped to recover the amine solvent, to produce de-scaled produced water. The concentrate produced water is further de-salted in step (j) by: (i) mixing the concentrate produced water with the amine solvent to form precipitates comprising sodium chloride salt in a fourth precipitator unit; (ii) removing precipitates from the concentrate produced water, and recovering at least most of the remaining amine solvent from precipitates by a fourth filter equipped to recover the amine solvent, to produce decanted produced water; and (iii) recycling the decanted produced water by blending with the de-scaled produced water from step (d) and feeding the blend stream to the stripping unit in step (e).

In yet another aspect, the present invention provides a method to de-oil, de-scale and de-salt produced water. The inventive method comprises the steps of: (a) separating oil from produced water by hydrophobic membranes to produce de-oiled produced water; (b) separating magnesium in the form of hydroxide from the de-oiled produced water to produce a first intermediate de-scaled produced water; (c) separating radium and barium in the form of sulfates from the first intermediate de-scaled produced water to produce a second intermediate de-scaled produced water; (d) separating calcium in the form of sulfoaluminate or sulfoferrate from the second intermediate de-scaled produced water to produce de-scaled produced water; (e) recovering at least most of the amine solvent from the de-scaled produced water by a stripping unit to produce de-aerated produced water; (f) using the de-aerated produced water for hydro-fracturing; or (g) blending the de-aerated produced water with low salinity water to produce a blend stream for hydro-fracturing; or (h) partially de-salting the de-aerated produced water by a desalination method to produce water distillate and concentrate produced water; or (i) further de-salting the concentrate produced water by a thermal crystallizer to produce further water distillate and sodium chloride salt; or (j) further de-salting the concentrate produced water to produce sodium chloride salt and decanted produced water. Magnesium is separated in the form of hydroxide in step (b) by: (i) mixing the de-oiled produced water with the amine solvent to form precipitates comprising magnesium in the form of hydroxide in a first precipitator unit; and (ii) removing precipitates from the de-oiled produced water, and recovering at least most of the remaining amine solvent from precipitates by a first filter equipped to recover the amine solvent, to produce the first intermediate de-scaled produced water. Radium and barium are separated in the form of sulfates in step (c) by: (i) mixing the first intermediate de-scaled produced water with sulfate-rich mine drainage water to form precipitates comprising radium and barium in the form of sulfates in a second precipitator unit; and (ii) removing precipitates from the first intermediate de-scaled produced water, and recovering at least most of the remaining amine solvent from precipitates by a second filter equipped to recover the amine solvent, to produce the second intermediate de-scaled produced water. Calcium is separated in the form of sulfoaluminate or sulfoferrate in step (d) by: (i) mixing the second intermediate de-scaled produced water with the amine solvent and a source of aluminum or iron to form precipitates comprising calcium in the form of sulfoaluminate or sulfoferrate in a third precipitator unit; and (ii) removing precipitates from the second intermediate de-scaled produced water, and recovering at least most of the remaining amine solvent from precipitates by a third filter equipped to recover the amine solvent, to produce the de-scaled produced water. The concentrate produced water is further de-salted in step (j) by: (i) mixing the concentrate produced water with the amine solvent to form precipitates comprising sodium chloride salt in a fourth precipitator unit; (ii) removing precipitates from the concentrate produced water, and recovering at least most of the remaining amine solvent from precipitates by a fourth filter equipped to recover the amine solvent, to produce decanted produced water; and (iii) recycling the decanted produced water by blending with the de-scaled produced water from step (d) and feeding the blend stream to the stripping unit in step (e).

In yet another aspect, the present invention provides a method to de-oil, de-scale and de-salt produced water. The inventive method comprises the steps of: (a) separating oil from produced water by hydrophobic membranes to produce de-oiled produced water; (b) separating radium and barium in the form of sulfates, and magnesium and strontium in the form of hydroxides from the de-oiled produced water to produce de-scaled produced water; (c) recovering at least most of the amine solvent from the de-scaled produced water by a stripping unit to produce de-aerated produced water; (d) using the de-aerated produced water for hydro-fracturing; or (e) blending the de-aerated produced water with low salinity water to produce a blend stream for hydro-fracturing; or (f) partially de-salting the de-aerated produced water by a desalination method to produce water distillate and concentrate produced water; or (g) further de-salting the concentrate produced water by a thermal crystallizer to produce further water distillate and sodium-calcium chloride salt; or (h) further de-salting the concentrate produced water to produce sodium-calcium chloride salt and decanted produced water. Radium and barium are separated in the form of sulfates, and magnesium and strontium are separated in the form of hydroxides in step (b) by: (i) mixing the de-oiled produced water with an amine solvent and a humic acid to form precipitates comprising radium and barium in the form of sulfates, and magnesium and strontium in the form of hydroxides in a first precipitator unit; and (ii) removing precipitates from the de-oiled produced water, and recovering at least most of the remaining amine solvent from precipitates by a first filter equipped to recover the amine solvent, to produce de-scaled produced water. The concentrate produced water is further de-salted in step (h) by: (i) mixing the concentrate produced water with the amine solvent to form precipitates comprising sodium-calcium chloride salt in a second precipitator unit; (ii) removing precipitates from the concentrate produced water, and recovering at least most of the remaining amine solvent from precipitates by a second filter equipped to recover the amine solvent, to produce decanted produced water; and (iii) recycling the decanted produced water by blending with the de-scaled produced water from step (b) and feeding the blend stream to the stripping unit in step (c).

The amine solvent is selected from the group consisting of isopropylamine, propylamine, dipropylamine, diisopropylamine, ethylamine, diethylamine, methylamine, dimethylamine, or a combination thereof. The desalination method is selected from the group consisting of thermal vapor compression, mechanical vapor recompression, multi-effects, vacuum membrane distillation, direct contact membrane distillation, membrane osmotic distillation, multi-stage flash membrane distillation, reverse osmosis, forward osmosis, or a combination thereof. The source of aluminum is selected from the group consisting of aluminum hydroxide, aluminum chlorohydrate, sodium aluminate, aluminum acetate, aluminum chloride, aluminum nitrate, or a combination thereof. The source of iron is selected from the group consisting of iron hydroxide, sodium ferrate, iron chloride, iron nitrate, or a combination thereof.

This invention is of particular interest in connection with applications such as, but is not limited to, unconventional oil and gas production, conventional oil and gas production, mine drainage water, flue gas desulfurization wastewater, agricultural drainage water, road de-icing salt production, sodium carbonate production, saline water desalination, mining, geothermal power plants, treatment of contaminated water sources (e.g., surface water or ground water) by produced water, natural brine or drainage resulting from all kinds of mining operations, and other related or similar applications.

This invention is not restricted to use in connection with one particular application. This invention can be used, in general, for the selective removal of inorganic from aqueous streams with precipitates ranging from macro- to submicron-sizes. Further objects, novel features, and advantages of the present invention will be apparent to those skilled in the art upon examining the accompanying drawings and upon reading the following description of the preferred embodiments, or may be learned by practice of the invention.

BRIEF DESCRIPTION OF THE DRAWINGS

FIGS. 1 to 4, being merely exemplary, contain various elements that may be present or omitted from actual process implementations depending upon the circumstances. The figures are drawn in a way that illustrates at least those elements that are significant for an understanding of the various embodiments and aspects of the invention. However, various other elements of the unique inventive methods, and the combination of apparatus for carrying out the methods, are also shown and/or briefly described to understand how various features, including optional or alternate features, may be utilized to provide an efficient and low cost design that can be conducted in a desired configuration, throughput size, and optimum operation.

DESCRIPTION OF THE PREFERRED EMBODIMENT

The Precipitation Concept

Figure 1:
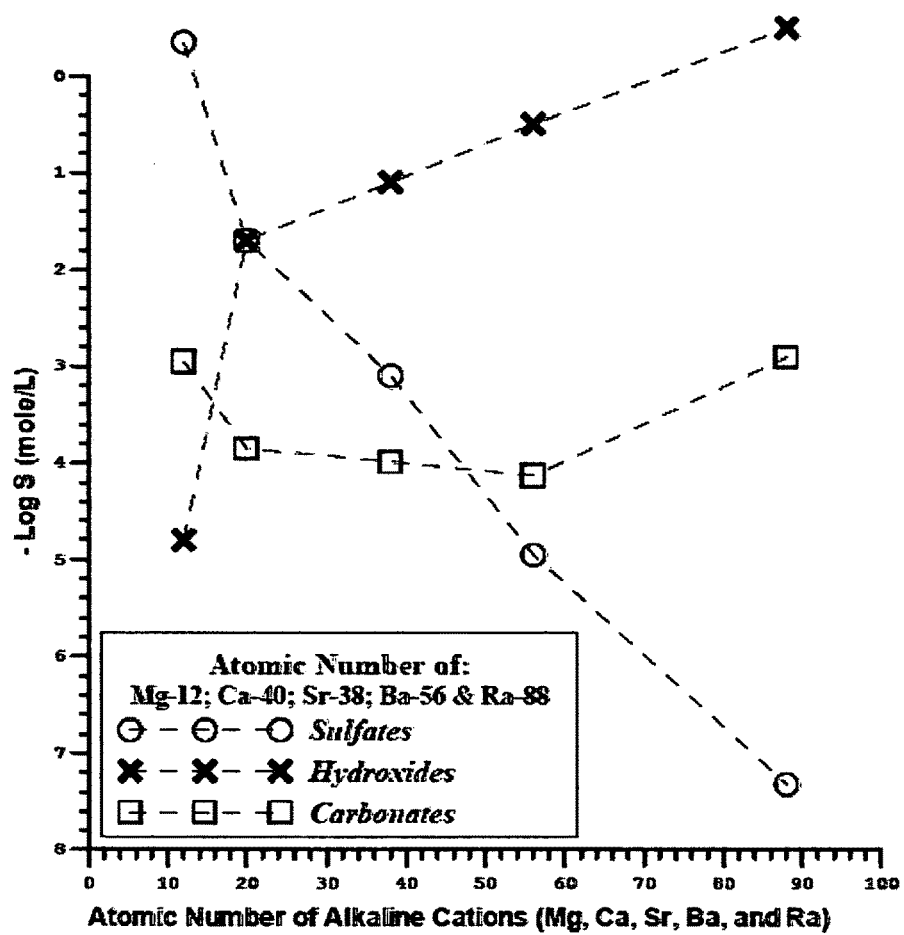
FIG. 1 illustrates the solubilities of alkaline cations in the form of sulfates, hydroxides and carbonates at 25° C.

I have previously invented the Liquid-Phase Precipitation process (LPP) for the separation of inorganic species from saline streams. The effect of the separation in LPP is to inter-mix a saline stream with a suitable solvent at ambient temperature and atmospheric pressure to form selective precipitates. The suitable solvents are those which have the capability to meet two basic criteria.

The first criteria is the suitability to precipitate targeted inorganic species from saline streams. The selected organic solvent must be miscible or at least soluble in water. The addition of such a solvent to a saline stream leads to the capture of part of the water molecules and reduces the solubility of inorganic species in the water which form insoluble precipitates. The solubility of the targeted inorganic species in the organic solvent is a critical factor in achieving the degree of saturation. Solubility related factors such as ionic charge, ionic radius, and the presence of a suitable anion in the saline stream play important roles in affecting and characterizing precipitates formation.

The second criteria is suitability for overall process design. For ease of recovery, the selected solvent must have favorable physical properties such as low boiling point, high vapor pressure, high relative volatility, and no azeotrope formation with water. From a process design standpoint, the selected solvent must have relatively low toxicity since traces of the organic solvent always remain in the discharge stream. Further, the selected solvent must be chemically stable, compatible with the process, and relatively inexpensive.

The energy required to thermally strip the solvent from the aqueous mixture after precipitating the targeted inorganic species generally depends on the solvent's boiling point. The solvent's boiling point determines the number of degrees to which the mixture must be heated. However, the solvent's specific heat and heat of vaporization are also critical. The specific heat of the solvent determines the number of calories that must be introduced into the mixture to raise it each degree whereas the heat of vaporization determines the number of additional calories needed to vaporize the solvent. As such, the smaller the solvent's specific heat and heat of vaporization, the fewer calories required for its thermal recovery.

Low boiling point solvents are thus preferred because the less difference between the mixture temperature and the solvent's boiling temperature, the fewer calories required for thermally stripping the solvent from the mixture. In addition, with higher boiling point solvents, less complete solvents thermal recovery since the recovered solvents carry significant amounts of water. Carried over water, with its high heat of vaporization, represents an energy penalty.

Several amine solvents have been identified for potential use in the LPP process. The selected solvents, which are derivatives of ammonia, are primary and secondary amines. They include methylamine (MA), ethylamine (EA), isopropylamine (IPA), propylamine (PA), dimethylamine (DMA), diethylamine (DEA), diisopropylamine (DIPA), and dipropylamine (DPA).

Nitrogen can form compounds with only three covalent bonds to other atoms. An ammonia molecule contains $sp^3$-hybridized nitrogen atom bonded to three hydrogen atoms. On the other hand, an amine molecule contains $sp^a$-hybridized nitrogen atom bonded to one carbon atom (primary amines) or more carbon atoms (2 carbon atoms in the case of secondary amines). The nitrogen has one orbital filled with a pair of unshared valence electrons, which allows these solvents to act as bases. Ammonia and the selected amines are therefore weak bases that could undergo reversible reactions with water or other weak acids. However, when such solvents react with a strong acid, their unshared electrons are used to form sigma bond with the acid, which drives the reaction to completion (irreversibly).

Table 3 presents some of the important characteristics of the selected solvents. However, IPA is the preferred solvent in the LPP process. The preference of using IPA is attributed to its high precipitation ability with different basic salts, overall favorable properties, near complete reaction with strong acids, and relatively minimal environmental risks.

Improving the performance of LPP is always a target. One of the essential improvements is to minimize, if not eliminate, the use of the amine solvent. Inorganic additives can alternatively replace organic additives or can be used in addition to organic additives to induce precipitation of targeted species. The suitable inorganic additives for LPP are those that can form an insoluble inorganic-based mineral of targeted charged species in a saline stream. Such inorganic additives should preferably be recoverable and recyclable, useable as a useful by-product, or produced locally from reject or waste streams. Such inorganic additives should also not themselves constitute pollutants. Several inorganic additives were identified, developed, and tested for LPP.

A second targeted improvement for LPP is to produce controllable precipitates that are uniformly distributed with high yield and preferably in submicron sizes. Submicron precipitates are fundamentally stable and form spontaneously if a narrow resistance time distribution is improvised and/or a surface active agent (naturally existing or induced) sufficiently acts as a dispersant to prevent immediate agglomeration of the newly formed precipitates. Submicron precipitates are thus dispersed phase with extreme fluxionality. On the other hand, non-spontaneous unstable macro-size precipitates will form if given sufficient time to rest.

The state (stabile, metastabe, or unstable) of given precipitates can be expressed thermodynamically by the Gibbs free energy relation as follows:

$$\Delta G = \Delta H - T\Delta S \quad (1)$$

where $\Delta G$ is the free energy of precipitates (provided by, for instance, mechanical agitation or other means), $\Delta H$ is the enthalpy that represents the binding energy of the dispersed phase precipitates in water, T is the temperature, and $\Delta S$ is the entropy of the dispersed phase precipitates (the state of precipitates disorder). The binding energy ($\Delta H$) can be expressed in terms of the surface tension ($\tau$) and the increase in the surface area ($\Delta A$) as follows:

$$\Delta G = \tau \Delta A - T \Delta S \qquad (2)$$

When the introduced free energy into the saline stream exceeds the binding energy of precipitates, individual precipitates are broken down and redistributed. In addition, when a surface active agent is present in the saline stream as an effective dispersant, τ is reduced and thus the precipitates binding energy is diminished. Furthermore, part of the introduced energy may not contribute to precipitates' deflocculating but it dissipates in the saline stream in the form of heat which reduces viscosity. All of these factors increase precipitates dispersion or disorder (positive entropy). As such, the change in the entropy ($\Delta S$) quantitatively defines precipitates dispersion (solvation).

The Compressed-Phase Precipitation (CPP) process is thus developed to achieve sub-micron precipitates in certain applications. CPP is conceptually similar to LPP in which the targeted inorganic species must be nearly insoluble in the amine solvent whereas the mother solvent (water) is miscible with the amine solvent. However, the difference is that fluids in the CPP process can be subjected to pressure and/or temperature manipulations, or fluids modifications to force unusual thermo-physical properties (e.g., exhibit liquid-like density but with higher diffusivity, higher compressibility and lower viscosity).

The fast diffusion combined with low viscosity of a compressed amine solvent into an aqueous phase produces faster supersaturation of targeted ionic species, and their possible precipitation in the desired and sub-micron and micron sizes. Thus, the precipitate's size, size distribution, morphology, and structure can be controlled. Achieving faster supersaturation would, in turn, minimize the use of the amine solvent, reduce the size of precipitation vessels, and allow the recovery of targeted ionic species in the desired precipitates shape and distribution.

Several factors could influence the performance of the precipitation process. Among such factors are: (1) the origin of the saline stream along with the identity and concentrations of its targeted ionic species; and (2) the way the additive (inorganic, organic, or both) is inter-mixed with the saline stream to induce precipitation.

The Chemistry of PW

Oil Content

As given in Tables 1 and 2, for example, PW from both Marcellus and Barnett basins contain dispersed and dissolved oil contents and reported in terms of oil & grease (O&G), dissolved organic carbon (DOC) and total organic carbon (TOC). Even though the reported contents may seem relatively small, or in the case of such contents abnormally fluctuate more than expected, their removal may be critical since they create higher viscosity liquor that makes solids filtration and de-watering more difficult and interfere with the performance of de-salting methods (e.g., as foulants for heat transfer surfaces and membranes).

Scale Content

As shown in Table 1, Marcellus PW has a relatively low median concentration of bicarbonate and nearly depleted of sulfate. However, the median concentrations of alkaline cations, especially the rear-end ones (strontium, barium and radium), are high and alkaline cations constitute about 31% of the total cations (meq./L). The total hardness (magnesium and calcium) as a result is extremely high.

Barnett PW as given in Table 2 is abnormally elevated in bicarbonate and modestly richen in sulfate. The median concentrations of alkaline cations (meq./L) in Barnett PW constitute about 13% of the total cations. However, ions pairing generally do not reach the levels of solubilities of their pure solid minerals. Only when the anion carrier is an appreciable constituent in water (e.g., sulfate in formation water), do the precipitation and dissolution (solvation) of pure phases form the dominant attenuation mechanism. Thus, the precipitation of the excess portions of the rear-end alkaline cations (strontium, barium and radium) in the form of sulfates likely took place downhole. The solvated portions of the rear-end alkaline cations in the form of sulfates in Barnett PW are therefore within their solubility limits. Thus, the median concentrations of such alkaline cations in Barnett PW are substantially lower than their median concentrations in Marcellus PW. Due to the high bicarbonate concentration, the median concentrations of magnesium and calcium are also appreciably lower in Barnett PW than their median concentrations in Marcellus PW. Consequently, the total hardness is much lower in Barnett PW than that in Marcellus PW.

The selective separation of most or all of alkaline cations to de-scale PW prior to de-salting is essential to: (1) isolate radioactivity and other minor but critical species from PW; (2) isolate scale-prone species and recover them as possibly useful by-products; and (3) facilitate the recovery of higher water distillate and the production of a usable salt.

Salt Content

The median TDS in Marcellus PW (157,000 mg/L) is about three folds higher than the median TDS in Barnett PW (51,000 mg/L). Once PW is de-oiled and de-scaled, a de-salting method or a combination of de-salting methods can take place. Sodium chloride can be produced and used, for example, as: (1) a road de-icing salt; (2) a feedstock to produce sodium carbonate if a source of carbon dioxide is available; or (3) a feedstock for the chlor-alkali industry. Alternatively, sodium-calcium chloride can be produced since it is a more effective road de-icing salt than sodium chloride. The effectiveness of road de-icing salt that contains a higher level of calcium chloride is attributed to calcium chloride's: (1) low freezing temperature (−32° C.), which is below that of sodium chloride and thus more effective at colder temperatures; (2) hygroscopic nature, which attracts moisture from its surroundings to jump start the ice melting action; and (3) exothermic nature since as it dissolves in contact with moisture, it releases a significant amount of heat that melts ice faster than the endothermic sodium chloride and other de-icing products that must draw heat from their surroundings to dissolve and form an ice-melting brine. Calcium may thus not be included in the selective precipitation of alkaline cations from PW prior to applying a de-salting method if the final salt product is desired to contain calcium (sodium-calcium chloride as a road de-icing salt).

The Fundamentals of PW Treatment

De-Oiling

The natural demulsification of oil-brine phases starts in some downhole formations where oil might preferentially squeeze through the narrow pores of organically surface coated rocks (hydrocarbons wet) and trapped by impermeable rocks (clay, shale or tight-sand). In such a natural downhole capillary flow, no shear or differential velocity (velocity is in the direction of the flow) or oil droplets rotation are induced. Thus, capillary flow is the most efficient method to separate oil droplets from water.

My de-oiling concept is simply analogous to the natural demulsification phenomenon of hydrocarbons. The concept takes advantage of the fact that dispersed oil droplets and PW are immiscible, and properly configured hydrophobic membrane would efficiently repel water (the membrane non-wetting liquid) and allow oil droplets (the membrane wetting fluid) to permeate through the hydrophobic membrane by applying a very low pressure.

However, such water repellent membranes do not permit the passage of water through the membrane until the water capillary pressure ($p_c$) of the membrane is exceeded. $p_c$ depends on the interfacial tension, contact angle, and the pore size distribution of the membrane as reflected by the following relation:

$$p_c = \frac{2\tau_{w-o}\cos\theta_{w-o}}{r} \quad (3)$$

where $\tau_{w-o}$ is the water-hydrocarbons interfacial tension, $\theta_{w-o}$ is the contact angle of a water droplet on the membrane surface in the presence of oil, r is the radius of the membrane pore.

The value of the $\theta_{w-o}$ can be related to various interfacial tensions as follows:

$$\cos\theta_{w-o} = \frac{\tau_{m-w} - \tau_{m-o}}{\tau_{w-o}} \quad (4)$$

where $\tau_{m-w}$ is interfacial tension of a membrane in contact with water, and $\tau_{m-0}$ is the interfacial tension of the same membrane in contact with oil. If $\tau_{m-w}$ is greater than $\tau_{m-o}$, then the membrane is hydrophobic ($0<\theta_{w-o}<90°$). This means that the value of $p_c$ is positive and thus the membrane is oil wet that permits the passage of oil droplets and repels water. It however, $\tau_{m-w}$ is lower than $\tau_{m-o}$, then the membrane is hydrophilic ($\theta_{w-o}>90°$). This means that the value of $p_c$ is negative, and the membrane is water wet that permits the passage of water and prevents oil droplets from entering the membrane pores against the applied pressure ($p_a$).

De-Scaling

FIG. 1 reveals that the two anions that pair with alkaline cations (magnesium, calcium, strontium, barium, and radium) with a wide range of solubilities are sulfate and hydroxide. It is clearly pronounced that solubilities of alkaline cations in the form of sulfates decrease in sequence with the increase of the atomic number (decrease of the charge density), whereas those in the form of hydroxides increase in sequence with the increase of the atomic number. Considered from a thermodynamic point of view, there is logic to such trends that may be explained by Gibbs free energy (Eq. 1), which is the fundamental foundation for the solubility or the solubility product of a cation in a hosting anion. Enthalpy and entropy are the contributing properties to Gibbs free energy. Alkaline cations in the form of sulfates are more dependent on the relative thermodynamic properties of the cation. The enthalpies of alkaline cations are roughly equal in magnitude whereas the entropies become smaller and yet near equal as the atomic number increases, especially for barium and radium. As such, the solubilities of such alkaline cations in the form of sulfates become nearly insoluble as the atomic number increases.

The entropies of alkaline cations in the form of hydroxides, particularly of strontium, barium and radium, are much larger than those in the form of sulfates since hydroxide ions tend to disperse and lose identity when solvated. It can be inferred that Gibbs free energies of alkaline cations in the form of hydroxides are driven largely by the hosting anion (hydroxide ions) more than the relative properties of the cation. However, the front-end alkaline cations (magnesium and calcium) are much less soluble than the rear-end ones (strontium, barium and radium) in the form of hydroxides. The magnitude of the enthalpy of $Mg(OH)_2$ (−114 kJ/mole) is about the same of $Ca(OH)_2$ (−130 kJ/mole) but the magnitude of the entropy (dispersion) of $Mg(OH)_2$ (−60 J/K mole) is negative and much smaller than that of $Ca(OH)_2$ (0.4 J/K mole) and therefore $Mg(OH)_2$ is much less soluble than $ca(oH)_2$. Strontium, barium and radium hydroxides, on the other hand, are largely hydrated since they are octahydrates (Sr—Ba—Ra—$(OH)_2.8H_2O$). As a result, they are substantially more soluble than $Mg(oH)_2$ and $ca(OH)_2$, and their solubilities appreciably increase in sequence with the increase of their atomic numbers.

FIG. 1 also shows that the solubilities of all alkaline cations in the form of carbonates are very low and fall roughly within about an order of magnitude from each other. Radium carbonate is the most soluble followed by magnesium, calcium, barium and strontium carbonates. However, the precipitation selectivity for the less soluble alkaline cations (strontium, calcium and barium) in the form of carbonates is nearly marginal over those that are slightly more soluble (radium and magnesium). Thus, the sequential precipitation using strictly the carbonate route for the entire series of alkaline cations from PW seems inappropriate.

The most appropriate route to isolate radioactivity from PW is thus the sulfate route. However, the sulfate route implies the co-precipitation of barium-radium sulfates. The co-precipitation of radium within the structure of barium sulfate precipitates is attributed to their near identical ionic (crystal) radius and polarizability (Table 4). Once barium and radium are precipitated in the form of sulfate from PW, the sequential precipitation of some or all of the remaining alkaline cations (magnesium, calcium and strontium) or the simultaneous precipitation of some of them can take place followed by the de-salting step.

Alternatively, the hydroxide route for alkaline cations can be implemented by keeping radium and barium dissolved in PW while precipitating first the front-end alkaline cations (magnesium and calcium) sequentially or simultaneously at conditions of basic pH. Once the front-end alkaline cations are precipitated from PW, the precipitation of barium-radium can then take place in the form of sulfates or carbonates or any other appropriate anion pairing before applying the de-salting step. Strontium as a non-radioactive species, on the other hand, can be precipitated with magnesium; or in a separate precipitation stage after the completion of magnesium precipitation; or with calcium; or with barium-radium.

De-Salting

Based on the median TDS of Marcellus PW (157,000 mg/L at day 14) and Barnett PW (51,000 mg/L at day 10-12) and if PW is sufficiently de-oiled and de-scaled, thermal de-salting methods would then be efficiently used as PW pre-concentrator to produce about 48% of water distillate from Marcellus PW and about 83% of water distillate from Barnett PW along with concentrate produced water. Such de-salting methods may include, but are not limited to, thermal vapor compression, mechanical vapor recompression, multi-effects, vacuum membrane distillation, direct contact membrane distillation, membrane osmotic distillation, multi-stage flash membrane distillation, or a combination of such units. Further treatment of the concentrate produced water by a thermal crystallizer or an innovatively induced precipitation would recover more water distillate and/or produce sodium-calcium chloride or sodium chloride salt.

Pressure-driven membranes such as Reverse Osmosis (RO) are limited to TDS of less than 45,000 mg/L. RO may thus seem inapplicable to PW from the Marcellus and Barnett basins based on their median TDS (Tables 1 and 2). This is also the case with PW from the Haynesville basin where the median TDS is about 110,000 mg/L. However, RO may be applicable to such PW: (1) in the first 3-5 days at certain locations, which may be the period of low-salinity PW that falls within the osmotic pressure limit of RO as well as the period of the highest flow of PW; and/or (2) if it is blend with low-salinity sulfate-rich source water such as mine drainage water, or possibly in some cases flue gas desulfurization wastewater or agricultural drainage water. On the other hand, RO is totally applicable to PW from the Fayetteville and Woodford basins since their median TDS are, respectively, 13,000 mg/L and 30,000 mg/L.

PW Treatment Methods

De-Oiling, De-Scaling and De-Salting PW from the Marcellus Basin and the Like

Figure 2:
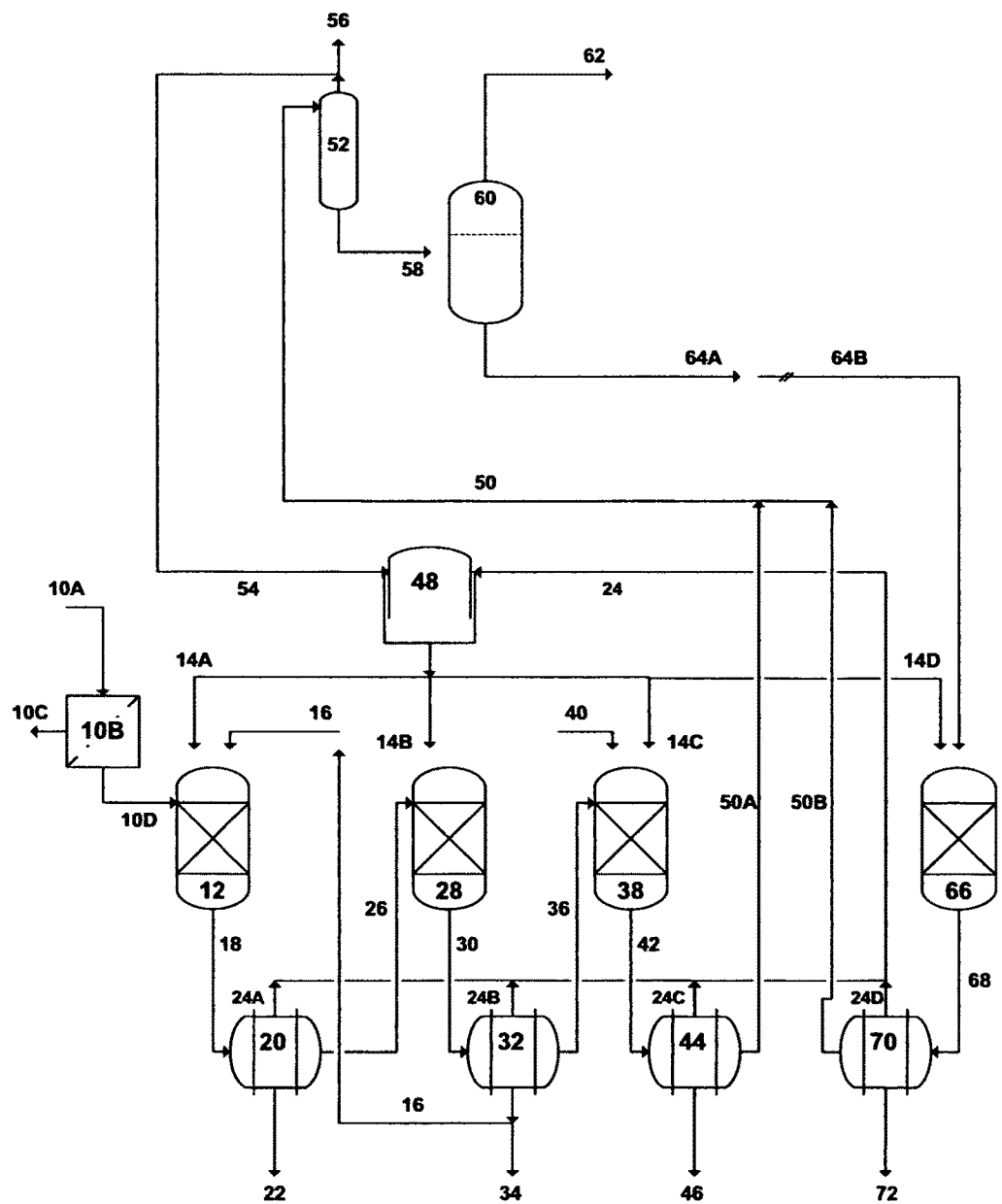
FIG. 2 illustrates a possible flow diagram for the invented method to de-oil, de-scale, and de-salt PW.

FIG. 2 depicts innovative treatment methods for PW from the Marcellus basin and the like where PW may be relatively high in oil content, high in the rear-end alkaline cations (strontium, barium and radium) contents, but depleted of sulfate. A pre-treated (e.g., clarified and aerated) PW [10A] is fed to a stage of hydrophobic membranes [10B] to separate oil droplets in a near pure form [10C] from the de-oiled PW [10D]. The applied pressure ($p_a$) in the hydrophobic membranes should be below the capillary pressure of water ($p_c$) so that hydrophobic membranes allow only the passage of oil droplets [10C] and repel PW [10D].

The de-oiled PW [10D] is then treated by multi-precipitation stages to de-scale PW. The first precipitation stage is aimed at the selective precipitation of barium and radium in the form of sulfates and if desired the minor levels of transition metals that some of them (e.g., manganese) may act as carriers for radium to isolate radioactivity from PW. The de-oiled PW [10D] is inter-mixed with a selected amine solvent [14A], and magnesium sulfate or sulfate-rich mine drainage water [16] as a sulfate source in the first precipitator unit [12] to co-precipitate barium-radium in the form of sulfates. Mine drainage water is within the proximity of shale gas exploration in the Marcellus basin. As shown in Table 5, mine drainage water is either distinctly acidic that typically contains elevated concentrations of sulfate and transition metals (e.g., iron, aluminum and manganese), or mildly acidic-neutral that contains lower concentrations of transition metals but still elevated with sulfate. The other distinct benefit of using mine drainage water as a sulfate source for PW from the Marcellus basin and the like is its low salinity (mostly less than 10,000 mg/L) and bromide content.

Since the solubility limit of barium sulfate is about one and one-half orders of magnitude lower than the solubility limit of strontium sulfate, the added amount (in meq./L) of sulfate (magnesium sulfate or sulfate-rich mine drainage water) should slightly exceed the concentration of barium to co-precipitate barium-radium sulfates and yet to maintain most of the non-radioactive strontium dissolved in PW to minimize the volume of radioactive precipitates. The added amount of the amine solvent [14A] is controlled by the pH, which serves as a hydroxide source to complete the precipitation of radium-barium sulfates in a very short time as well as to regulate the precipitation degree of transition metals (from marginal to complete precipitation) in the form of hydroxides or oxides in the first precipitation stage. The concentrations of transition metals in PW are typically minor but some of them are critical (e.g., iron and manganese), and therefore their removal from PW is important. In this case, the precipitation of transition metals within the first precipitation stage of barium-radium sulfates is desirable, and the pH should be kept mildly alkaline (e.g., below 9 depending on the PW chemistry) to avoid substantial precipitation of magnesium hydroxide. On the other hand, the concentrations of some critical metals (e.g., iron and aluminum) may become significant upon mixing PW with sulfate-rich mine drainage water as a sulfate source, and thus their precipitation in the first stage with barium-radium sulfates may not be desirable since they may be needed in a subsequent precipitation stage (e.g., to precipitate calcium in the form of chloroaluminate, chloroferrate, sulfoaluminate, or sulfoferrate) of the de-scaling step.

The outlet stream [18] from the first precipitator unit [12] is directed to the first filtration unit [20], which can be equipped with solvent recovery (may include nitrogen gas compressor, heater, and condenser), to separate the formed precipitates [22] from the first intermediate de-scaled PW [26]. The recovered amine solvent [24A] from the first filtration unit [20] is recycled [24] to the solvent storage tank [48]. Depending on the radioactivity level of the radium-barium precipitates [22] and the governing regulations, such precipitates disposal route can be a landfill (as a nonhazardous solid waste) or a NORM disposal facility (as a Low Level Waste, LLW). For disposal as LLW, the precipitates [22] should be dehydrated to 95 wt % solids, and it may therefore be subjected to further dewatering and dehydration (not shown in FIG. 2). However, the cost LLW disposal may be prohibitive especially when the amount of radioactive precipitates is large, and therefore radium-barium sulfates precipitates may be: (1) re-dissolved by a concentrated acid (e.g., sulfuric acid) and disposed of in deep injection wells; or (2) blend with other salt precipitates to reduce the radioactive content and meet the regulations for disposal in landfills.

The second precipitation stage is aimed at selectively precipitating magnesium in the form of hydroxide (brucite) from the first intermediate de-scaled PW. The first intermediate de-scaled PW [26] is thus fed to the second precipitator unit [28] where it is inter-mixed with an additional amount of the selected amine solvent [14B] to precipitate brucite. The outlet stream [30] from the second precipitator unit [28] is then fed to the second filtration unit [32], which can be equipped with solvent recovery, to separate the formed brucite precipitates [34] from the second intermediate de-scaled PW [36]. The recovered amine solvent [24B] from the second filtration unit [30] is recycled [24] to the solvent storage tank [48]. In the case of using magnesium sulfate as a sulfate source, a portion of the brucite precipitates or the entire amount of such precipitates [34] if desired can be converted to magnesium sulfate by sulfuric acid (not shown in FIG. 2). The regenerated magnesium sulfate can be recycled as a sulfate source [16] to the first precipitator unit [12] to precipitate radium-barium sulfates.

It should be pointed out that, if desired, bromide in PW can be converted to hypo-bromite by disinfecting PW prior to conducting the de-oiling and de-scaling steps with an oxidizing agent such as sodium or calcium hypo-chlorite. Hypo-bromite can then be precipitated within the bruicte precipitation stage under the same conditions of basic pH. My testing results indicated that bromide can be removed from PW by 95-99%.

The third precipitation stage targets the removal of strontium from the second intermediate de-scaled PW. Humic acids when added to a saline stream with high ionic strength such as PW precipitate as agglomerates of their molecules. Such agglomerates bound some divalent and trivalent cations. The preferential binding of strontium by a humic acid using one of the selected amine solvent as a hydroxide source was tested in my experiments and found to be very effective in precipitating strontium from PW. Unrefined leonardite, for instance, contains a high content of humic acid (>80%), which may be used as an inexpensive source of humic acid. The second intermediate de-scaled PW [36] is fed to the third precipitator unit [38] where it is intermixed with a humic acid [40]. A decanted feed stock of the humic acid [40] can be made, for example, by rigorously mixing leonardite with water. The carried over amine solvent as a hydroxide source within the second intermediate de-scaled PW should be sufficient to induce the precipitation of strontium. An additional amount of the amine solvent [14C], if needed, can be introduced to the third precipitator unit [38]. The outlet stream [42] from the third precipitator unit [38] is then fed to the third filtration unit [44], which can be equipped with solvent recovery, to separate the formed strontium precipitates [46] from the de-scaled PW [50A]. The recovered organic solvent [24C] from the third filtration unit [44] is recycled [24] to the solvent storage tank [48].

The concentrations range of strontium in PW from the Marcellus Basin varies considerably between 46 and 5,350 mg/L. However, naturally occurring strontium is not radioactive. Depending on the concentration of strontium in PW, it can thus be precipitated upon the addition of a humic acid and a hydroxide source in: (1) a standalone stage as described above; or (2) the first precipitation stage with radium-barium sulfates upon the addition of higher concentration of sulfate or a humic acid; or (3) the second precipitation stage with magnesium hydroxide upon the addition of a humic acid. If the precipitation of calcium within the de-scaled step is desired, then calcium can be precipitated in the form of carbonate in the third precipitation stage as shown in FIG. 2 upon mixing the second intermediate de-scaled PW [36] from the second precipitation stage with a carbonate source [40] such as, but not limited to, sodium carbonate in the third precipitator unit [38]. The addition of the amine solvent [14C] in such third precipitation stage may not be needed if sodium carbonate is used as a carbonate source since it's an alkaline additive. Strontium in this case, if not forced to precipitate in the first precipitation stage with radium-barium sulfates or in the second precipitation stage with magnesium hydroxide, then it would co-precipitate in the form of carbonate with calcium.

Alternatively, the precipitation of calcium within the de-scaling step can be in the form of calcium chloroaluminate or chloroferrate in the third precipitation stage as shown in FIG. 2 upon mixing the second intermediate de-scaled PW [36] from the second precipitation stage with a source of a trivalent cation such as aluminum or iron [40] in the third precipitator unit [38]. The aluminum source can be aluminum hydroxide, aluminum chlorohydrate, sodium aluminate, aluminum acetate, aluminum chloride, or aluminum nitrate. The iron source can be iron hydroxide, sodium ferrate, iron chloride, and iron nitrate. The addition of the organic solvent [14C] in the third precipitation stage may not be needed if the source of the trivalent cation is aluminum hydroxide or iron hydroxide since each of such additives also serves as a hydroxide source. Strontium in this case may be forced to precipitate in the first precipitation stage with radium-barium sulfates, in the second precipitation stage with magnesium hydroxide, in a standalone fourth precipitation stage (not shown in FIG. 2), or strontium may be left in the de-scaled PW as a minor non-radioactive species especially if it is concentration is relatively low.

A further precipitation alternative of calcium within the de-scaling step can be in the form of calcium sulfoaluminate or sulfoferrate in the third precipitation stage as shown in FIG. 2 upon mixing the second intermediate de-scaled PW [36] from the second precipitation stage with an additional amount of sulfate-rich mine drainage water along with a supplementary source of a trivalent cation such as aluminum or iron [40] in the third precipitator unit [38]. The needed amount of sulfate (in meq./L) in this third precipitation stage should be sufficient to bind and precipitate calcium in the form of sulfoaluminate or sulfoferrate. The aluminum source can be aluminum hydroxide, aluminum chlorohydrate, sodium aluminate, aluminum acetate, aluminum chloride, or aluminum nitrate. The iron source can be iron hydroxide, sodium ferrate, iron chloride, and iron nitrate. The addition of the amine solvent [14C] in the third precipitation stage may not be needed if the source of the trivalent cation is aluminum hydroxide or iron hydroxide since each of such additives also serves as a hydroxide source. Strontium in this case may be allowed to precipitate in the first precipitation stage with radium-barium sulfates, in the second precipitation stage with magnesium hydroxide, in a standalone fourth precipitation stage (not shown in FIG. 2), or strontium may be left in the de-scaled PW as a minor non-radioactive species especially if it is concentration is relatively low.

Figure 3:
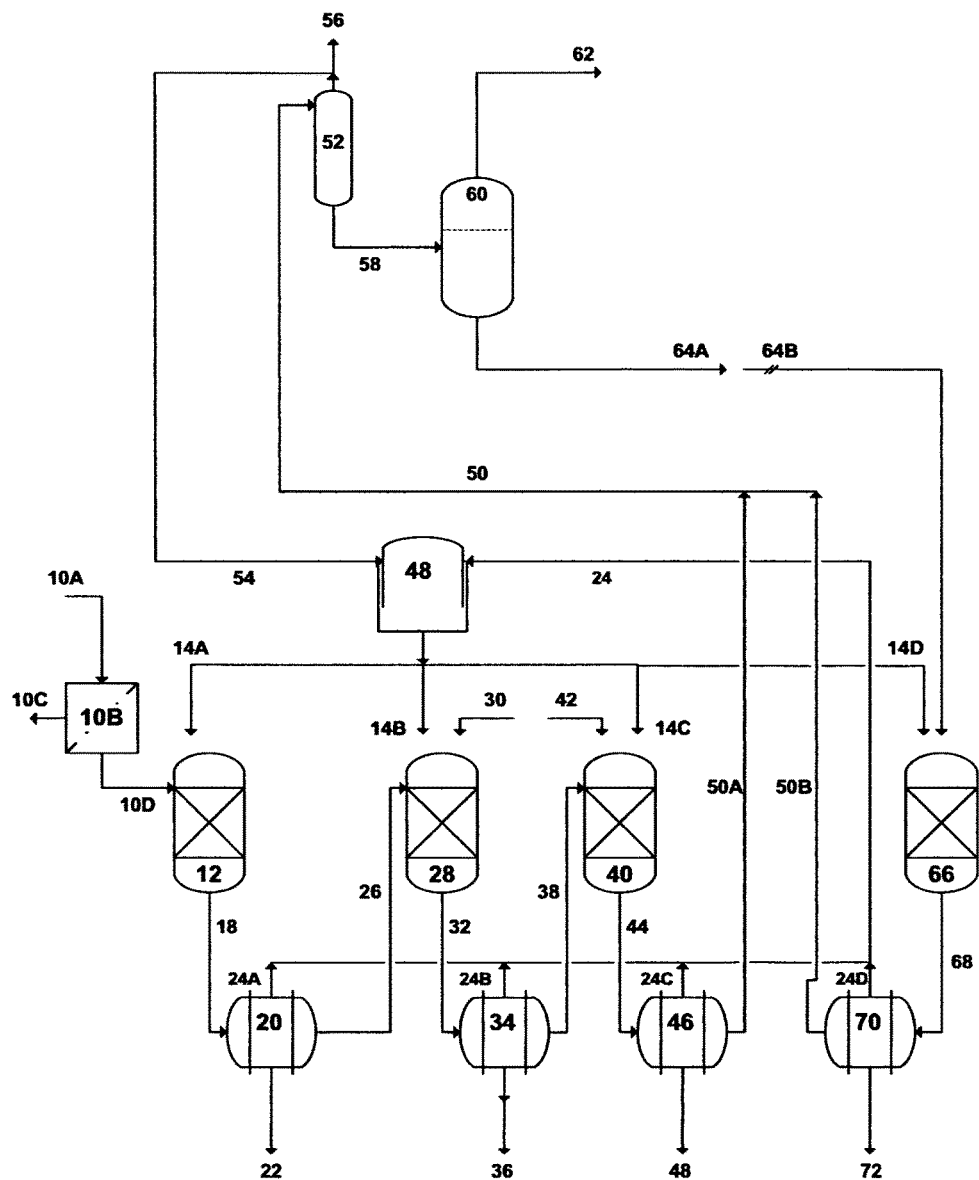
FIG. 3 illustrates a possible alternative flow diagram for the invented method to de-oil, de-scale, and de-salt PW.

Different arrangements for the precipitation stages in the de-scaling step to treat PW from Marcellus basin and the like is depicted in FIG. 3. One of the arrangements is that: (1) the precipitation of magnesium hydroxide is targeted in the first precipitator unit [12] upon the addition of a selected amine solvent [14A]; (2) the precipitation of calcium chloroaluminate or calcium chloroferrate is targeted in the second precipitator unit [28] upon the addition of a source of a trivalent cation such as aluminum or iron [30], and the amine solvent [14B] if need; and (3) then the precipitation of radium and barium in the third precipitator unit [40] in the form of sulfates upon the addition of magnesium sulfate or sulfate-rich mine drainage water [42]; or in the form of carbonates upon the addition of sodium carbonate or a carbonate source [42]. The addition of the amine solvent [14C] to the third precipitator unit [40] may not be needed in the third precipitation stage of radium-barium in the form of sulfates or in the form of carbonates. Strontium may be: (1) co-precipitated with magnesium hydroxide in the first precipitator unit [12] upon the addition of a humic acid (not shown in FIG. 3); or (2) co-precipitated with radium and barium sulfates in the third precipitator unit [40] upon the addition of a higher concentration of sulfate or a humic acid (not shown in FIG. 3); or (3) co-precipitated with radium and barium in the form of carbonates in the third precipitator unit [40]; or (4) left in the de-scaled PW as a minor non-radioactive species if strontium concentration is relatively low.

A further different arrangement for the precipitation stages in the de-scaling step to treat PW from Marcellus basin and the like is also depicted in FIG. 3 where: (1) the precipitation of magnesium hydroxide is targeted in the first precipitator unit [12] upon the addition of a selected amine solvent [14A]; (2) the precipitation of radium and barium in the form of sulfates is targeted in the second precipitator unit [28] upon the addition of sulfate-rich mine drainage water [30] but without the addition of an amine solvent [14B]; and (3) then the precipitation of calcium is targeted in the third precipitator unit [40] in the form of calcium sulfoaluminate or sulfoferrate upon the addition of a supplementary source of a trivalent cation such as aluminum or iron [42], and the amine solvent [14C] if needed. In this de-scaling method, sulfate-rich mine drainage water is used as a sulfate source for the precipitation of both radium-barium sulfates (in the second precipitation stage) and calcium sulfoaluminate or calcium sulfoferrate (in the third precipitation stage). This method may allow marginal precipitation of transition metals with radium-barium sulfates (lack of sufficient hydroxide since an amine solvent is not added in the second precipitation stage), but completes the precipitation of such metals as a part of the precipitated calcium sulfoaluminate or calcium sulfoferrate mineral. Strontium may be: (1) co-precipitated with magnesium in the first precipitator unit [12] upon the addition of a humic acid (not shown in FIG. 3); and (2) mostly co-precipitated with radium and barium in the form of sulfates in the second precipitator unit [28]. It is worth noting that such a de-scaling method can be truncated to two precipitation stages: (1) the precipitation of radium and barium in the form of sulfates is targeted in the first precipitator unit upon the addition of sulfate-rich mine drainage water along with a sufficient amount of an amine solvent to reach a pH that may slightly above neutral to accelerate the precipitation of radium-barium sulfates but does not allow significant precipitation of transition metals; and (2) the precipitation of calcium is then targeted in the second precipitator unit in the form of calcium sulfoaluminate or sulfoferrate upon the addition of a supplementary source of a trivalent cation such as aluminum or iron, and the amine solvent. Magnesium hydroxide is co-precipitated within the calcium precipitation stage.

The advantages of using magnesium sulfate as a sulfate source in the de-scaling step of this invention are that magnesium sulfate is recoverable and recyclable for reuse in the de-scaling step or contributable to a useful by-product (production of magnesium hydroxide). On the other hand, the advantages of using sulfate-rich mine drainage water as part of the de-scaling step in this invention are: (1) it serves as a sulfate source (for the precipitation of radium-barium and then calcium if desired) and may be a partial source of the needed transition metals (for the precipitation of calcium); (2) it substantially reduces the concentrations of alkaline cations and bromide upon mixing with PW, and consequently it minimizes their de-scaling treatment cost; (3) it also substantially reduces the salinity upon mixing with PW, which in turn, contributes to higher recovery of water distillate in the de-salting step and/or may allow the use of RO to de-salt the mixed stream; and (4) the beneficial utilization of mine drainage water that is currently contaminating waterways in the impacted states.

As shown in FIGS. 2 and 3, the de-scaled PW (depleted of most or all alkaline cations) [50] from the third filtration unit [44] is fed to the stripping unit (de-aerator) [52] to separate the amine solvent from the de-scaled PW. Heating may be required to enhance the separation of the amine solvent and therefore it can also be introduced to the de-scaled PW before it enters the de-aerator or introduced directly to the de-aerator (e.g., steam). The amine solvent from the de-aerator [52] is condensed and recycled [54] to the solvent storage tank [48] and the non-condensable gases are vented [56].

The de-aerated PW [58] may be used directly as a hydro-fracturing fluid, or may be blend with low salinity source water (e.g., potable water) and used as a hydro-fracturing fluid. Some producers are considering the use of de-scaled PW with salinity as high as 120,000 mg/L, while other producers have used de-scaled PW with salinity up to 35,000 mg/L. The use of higher salinity hydro-fracturing fluid is being driven by state and regional potable water availability, the costs of PW transportation and disposal in injection wells, and lack of reliable and cost effective PW treatment (de-scaling) methods. However, some producers may still insist on using potable water in hydro-fracturing and the justification is to presumably avoid downhole scaling issues but the other subtle incentive to continue using potable water may be it is low cost since it is much cheaper than the cost of the available PW de-scaling methods (e.g., by at least 75%).

The de-aerated PW [58] may therefore be de-salted [60] by a thermal de-salting unit, pressure-driven de-salting unit, or a combination of such units as shown in FIGS. 2 and 3 to produce water distillate [62] and concentrate PW [64A]. The concentrate PW [64A] is either rejected in disposal wells or treated further [64B] by a thermal crystallizer (not shown in FIGS. 2 and 3) such as a forced-circulation type to produce more water distillate and salt (sodium-calcium chloride or sodium chloride).

However, a forced-circulation crystallizer is typically more expensive than, for example, the widely used film-based mechanical vapor recompression (MVR) since it requires large bore circulating pipes and large re-circulating pumps in addition to a considerably higher operating cost. Alternately, further reduction in the volume of the concentrate PW [64B] and salt recovery can be achieved by inducing precipitation in a fourth precipitation stage as shown in FIGS. 2 and 3. The concentrate PW [64B], which may be nearly saturated with sodium chloride (along with calcium chloride if the de-scaling step exclude the precipitation of calcium) is then fed to the fourth precipitator unit [66] where it is inter-mixed with the amine solvent [14D] to precipitate sodium-calcium chloride or sodium chloride. The outlet stream [68] from the fourth precipitator unit [66] is fed to the fourth filtration unit [70], which can be equipped with solvent recovery, to separate precipitates [72]. The recovered amine solvent [24D] from the fourth filtration unit [70] is recycled [24] to the solvent storage tank [48]. The precipitates [72] may be subjected to further dewatering and dehydration (not shown in FIGS. 2 and 3). The decanted PW [50B] from the fourth precipitation stage is mixed with the de-scaled PW [50A] from the third precipitation stage and the blend stream is fed to the de-aerator [52].

De-Oiling, De-Scaling and De-Salting PW from the Barnett Basin and the Like

The situations in the Barnett basin differ from that in the Marcellus basin in two distinct factors: (1) disposal of PW from the Barnett basin in injection wells is easily available and inexpensive; and (2) the concentrations of the rear-end alkaline cations (strontium, barium and radium) in PW are low, especially barium and radium, and the concentration of sulfate nearly matches the concentrations of such rear-end alkaline cations. Thus, treatment of PW in the Barnett basin and the like may not be considered unless the availability of potable water is an issue due to, for example, drought conditions or public pressure.

Figure 4:
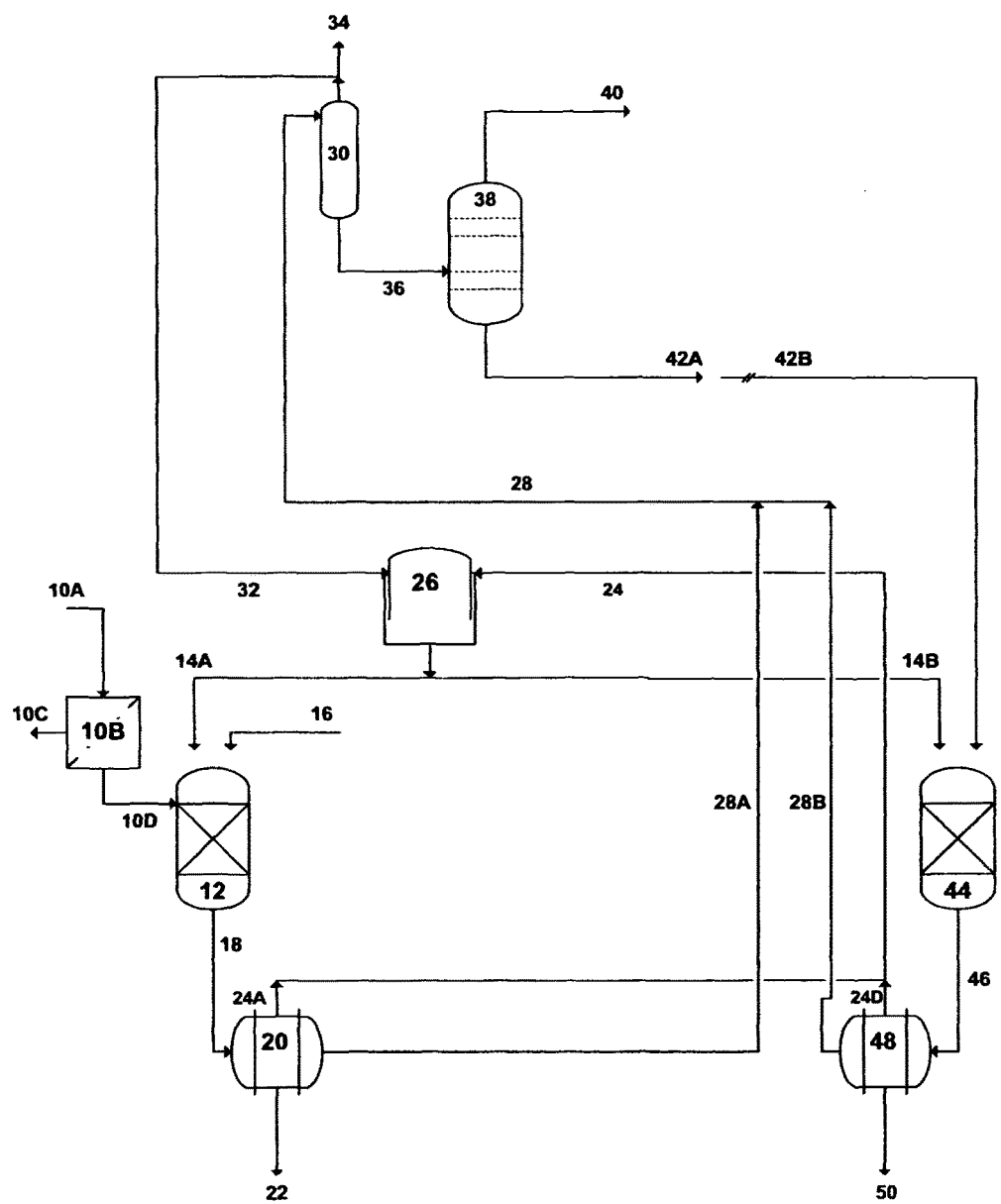
FIG. 4 illustrates a possible truncated flow diagram for the invented method to de-oil, de-scale, and de-salt PW.

Nevertheless, one of the possible truncated treatment methods in this invention for PW from the Barnett basin and the like is depicted in FIG. 4. A pre-treated (e.g., clarified and de-aerated) PW [10A] is fed to a stage of hydrophobic membranes [10B] to recover oil droplets in a near pure form [10C] from the de-oiled PW [10D].

The de-scaling step to treat the de-oiled PW can be truncated to a single precipitation stage, which is aimed at simultaneous precipitation of radium-barium in the form of sulfates, magnesium-strontium in the form of hydroxides, as well as the minor levels of transition metals to produce de-scaled PW. As such, the de-oiled PW [10D] is fed to the first precipitator unit [12] where it is inter-mixed with a humic acid [16] and a selected amine solvent [14A]. A decanted feed stock of the humic acid [16] can be made, for example, from rigorously mixing leonardite with water. The addition of the amine solvent: (1) allows the precipitation of magnesium in the form of hydroxide; (2) along with humic acid allow the precipitation of strontium in the form of hydroxide; and (3) along with the naturally existing sulfate in PW force the precipitation of radium-barium in the form of sulfates. The outlet stream [18] from the precipitation unit [12] is directed to the first filtration unit [20], which can be equipped with solvent recovery, to separate the formed precipitates [22] from the de-scaled PW [28A]. The recovered amine solvent [24A] from the filtration unit [20] is recycled [24] to the solvent storage tank [26]. Depending on the radioactivity level of the precipitates [22] and the governing regulations, the precipitates disposal route is most likely a landfill (as a nonhazardous solid waste) or a NORM disposal facility (as a Low Level Waste, LLW). For disposal as LLW, the precipitates [22] should be dehydrated to 95 wt % solids, and therefore it should be subjected to further dewatering and dehydration (not shown in FIG. 4).

The de-scaled PW [28] from the first filtration unit [20] is fed to the stripping unit (de-aerator) [30] separate the amine solvent from the de-scaled PW. The stripped off amine solvent from the de-aerator [30] is condensed and recycled [32] to the solvent storage tank [26] and the non-condensable gases are vented [34]. The de-aerated PW [36] may be used directly as a hydro-fracturing fluid; or may be blend with low salinity source water (e.g., potable water) and used as a hydro-fracturing fluid; or may be de-salted [38] by a thermal de-salting unit, pressure-driven de-salting unit, or a combination of such units to produce water distillate [40] and concentrate PW [42A].

The concentrate PW [42A] is either rejected in disposal wells or concentrated further [42B] by a thermal crystallizer (not shown in FIG. 4) such as a forced-circulation type to produce more water distillate and salt (sodium-calcium chloride). Alternately, salt recovery from the concentrate PW [42B] can be achieved by inducing precipitation in a second precipitation stage as shown in FIG. 4. The concentrate PW [42B], which may be nearly saturated with sodium chloride, is then fed to the second precipitator unit [44] where it is inter-mixed with the amine solvent [14B] to precipitate sodium-calcium chloride. The outlet stream [46] from the second precipitator unit [44] is fed to the second filtration unit [48], which can be equipped with solvent recovery, to separate precipitates [50] from the decanted PW [28B]. The recovered amine solvent [24B] from the second filtration unit [48] is recycled [24] to the solvent storage tank [26]. The precipitates [50] may be subjected to further dewatering and dehydration (not shown in FIG. 4). The decanted PW [28B] is then mixed with the de-scaled PW [28A] and the blend stream [28] is fed to the de-aerator [30].

If desired, a second stage can be added to precipitate calcium from Barnett PW in the form: (1) carbonate upon the addition of a carbonate source; or (2) chloroaluminate or chloroferrate upon the addition of a source of a trivalent cation (aluminum or iron) and an amine solvent.

It is worth noting that prior to conducting the de-oiling and de-scaling steps, PW may be disinfected by hypo-chlorite and clarified [10A] by a greensand filter (manganese oxide coated media) or manganese dioxide filter (solid core media) to destroy iron bacteria, and to remove transition metals (e.g., iron and manganese), hydrogen sulfide, and may be some radium as a byproduct of removing manganese. Such filters' media can be regenerated intermittently or continuously by a solution of hypo-chlorite and the volumes of their backwash water are nearly the same (backwash cycle: 10-12 minutes at about 10-12 gallons per minute (gpm)/ft$^2$ for the manganese oxide coated media; and 4-5 minutes at about 25-30 gpm/ft$^2$ for the heavier manganese dioxide media). The backwash water from such filters' media may be recycled to a selected precipitation stage of the de-scaling step where the co-precipitation of transition metals is desired; by-passing the de-oiling step (the hydrophobic membranes).

It should be pointed out that the de-oiling step [10B-10D] as given in FIGS. 2, 3 and 4 can be eliminated if the clarified PW [10A] is sufficiently depleted of oil content (e.g., <10 mg/L) or the de-scaled PW is directly used for hydro-fracturing.

TABLE 1

Samples of PW at Day 14 from the Marcellus Basin.

| Concentration (mg/L) | Range | Median |
|---|---|---|
| $Na^+$ | 1,100-44,100 | 36,400 |
| $K^+$ | 8-1,010 | 281 |
| $Mg^{+2}$ | 22-1,800 | 875 |
| $Ca^{+2}$ | 204-14,800 | 11,200 |
| $Sr^{+2}$ | 46-5,350 | 2,330 |
| $Ba^{+2}$ | 76-13,600 | 1,990 |
| $Ra^{+2}$ (Total: Isotopes 226 and 228) | 73-6,540* | |
| $Fe^{+2}$ | 14-59 | 47 |
| $Mn^{+2}$ | 1.2-8.4 | 5.6 |
| $Zn^{+2}$ | 0.07-0.14 | 0.09 |
| $Al^{+3}$ | 0.15-0.91 | 0.5 |
| B | 2.7-3,880 | 20 |
| $Cl^-$ | 1,070-151,000 | 98,300 |
| $Br^-$ | 16-1,190 | 872 |
| $HCO_3^-$ | 26-95 | 71 |
| $SO_4^{-2}$ | 0.8-89 | <50 |
| Total Dissolved Solids (TDS) | 3,010-228,000 | 157,000 |
| Total Hardness (TH) | 600-44,407 | 31,596 |
| Total Organic Carbon (TOC) | 1.2-509 | 14 |
| Dissolved Organic Carbon (DOC) | 5-695 | 43 |
| Oil & Grease (O&G) | 7.4-103 | 30.8 |
| Chemical Oxygen Demand (COD) | 28-128,000 | 8,370 |
| pH | 5.8-6.6 | 6.2 |

*pCi/L

TABLE 2

Samples of PW at Day 10-12 from the Barnett Basin.

| Concentration (mg/L) | Range | Median |
|---|---|---|
| $Na^+$ | 4,370-28,200 | 18,850 |
| $K^+$ | 80-750 | 316 |
| $Mg^{+2}$ | 149-755 | 255 |
| $Ca^{+2}$ | 1,110-6,730 | 1,600 |
| $Sr^{+2}$ | 48-1,550 | 529 |
| $Ba^{+2}$ | 0.93-17.9 | 3.6 |
| $Ra^{+2}$ | | |
| $Fe^{+2}$ | 12.1-93.8 | 24.9 |
| $Mn^{+2}$ | 0.25-2.20 | 0.86 |
| $Zn^{+2}$ | 0.10-0.36 | 0.15 |
| $Al^{+3}$ | 0.37-2.21 | 0.43 |
| B | 7.0-31.9 | 30.3 |

TABLE 2-continued

Samples of PW at Day 10-12 from the Barnett Basin.

| Concentration (mg/L) | Range | Median |
|---|---|---|
| $Cl^-$ | 9,600-60,800 | 34,700 |
| $Br^-$ | 117-798 | 589 |
| $HCO_3^-$ | 215-1,240 | 725 |
| $SO_4^{-2}$ | 120-1,260 | 709 |
| Total Dissolved Solids (TDS) | 16,400-97,800 | 50,550 |
| Total Hardness (TH) | 3,500-21,000 | 5,800 |
| Total Organic Carbon (TOC) | 6.2-36.2 | 9.75 |
| Dissolved Organic Carbon (DOC) | 5.5-65.3 | 11.2 |
| Oil & Grease (O&G) | 88.2-1,430 | 163.5 |
| Chemical Oxygen Demand (COD) | 927-3,150 | 2,945 |
| pH | 6.5-7.2 | 7.05 |

TABLE 3

Properties of the Selected Organic Solvents.

| Fluid | Solubility in Water | $T_b$ °C. | $C_p$ kJ/kg °C. | $H_v$ kJ/kg | $\Delta H_f^0$ kJ/kg |
|---|---|---|---|---|---|
| $NH_3$ | Highly Soluble | −33.45 | 2.19 | 1,370.8 | −2,695 |
| MA ($CH_5N$) | Extremely Soluble | −6.35 | 3.28 | 790.8 | −1,517 |
| DMA ($C_2H_7N$) | Extremely Soluble | 6.85 | 3.03 | 587.4 | −974 |
| EA ($C_2H_7N$) | Miscible | 16.55 | 2.85 | 621.8 | −1,644 |
| DEA ($C_4H_{11}N$) | Miscible | 55.45 | 2.44 | 380.4 | −1,418 |
| IPA ($C_3H_9N$) | Miscible | 32.45 | 2.77 | 460.1 | −1,900 |
| DIPA ($C_6H_{15}N$) | Highly Soluble | 83.95 | 2.64 | 341.9 | −1,765 |
| PA ($C_3H_9N$) | Miscible | 48.65 | 2.75 | 502.6 | −1,717 |
| DPA ($C_6H_{15}N$) | Soluble | 109.35 | | 368.6 | −1,543 |

$T_b$: Normal Boiling Point;
$C_p$: Specific Heat Capacity;
$H_v$: Heat of Vaporization at Normal Boiling Point; and
$\Delta H_f^0$: Standard Enthalpy of Formation.

TABLE 4

Some Relevant Properties of Alkaline Cations.

| Cation | Atomic Number | Charge Density | Crystal Radius (A°) | Polarizability (A°3) |
|---|---|---|---|---|
| $Mg^{+2}$ | 12 | 3.01 | 0.65 | 10.6 |
| $Ca^{+2}$ | 20 | 2.02 | 0.98 | 22.8 |
| $Sr^{+2}$ | 38 | 1.77 | 1.16 | 27.6 |
| $Ba^{+2}$ | 56 | 1.48 | 1.36 | 39.7 |
| $Ra^{+2}$ | 88 | 1.32 | 1.43 | 38.3 |

TABLE 5

Samples of Mine Drainage Water (Coal) in Pennsylvania.

| Concentration (mg/L) | Range |
|---|---|
| "Distinctly Acidic" Mine Drainage Water | |
| $Mg^{+2}$ | 39-225 |
| $Ca^{+2}$ | 65-190 |
| $Fe^{+2}$ | 74-1,560 |
| $Mn^{+2}$ | 34-120 |
| $Al^{+3}$ | 24-270 |
| $SO_4^{-2}$ | 1,800-7,600 |
| pH | 1.9-2.6 |
| "Mildly Acidic to Neutral" Mine Drainage Water | |
| $Mg^{+2}$ | 0-130 |
| $Ca^{+2}$ | 27-140 |
| $Fe^{+2}$ | 5-260 |
| $Mn^{+2}$ | 4-49 |
| $Al^{+3}$ | 0.3-28 |

TABLE 5-continued

Samples of Mine Drainage Water (Coal) in Pennsylvania.

| Concentration (mg/L) | Range |
|---|---|
| $SO_4^{-2}$ | 680-3,400 |
| pH | 3.8-7.6 |

What is claimed is:

1. A method to de-oil, de-scale and de-salt produced water, said method comprising the steps of:
   (a) separating oil from said produced water by hydrophobic membranes to produce de-oiled produced water;
   (b) separating radium and barium in the form of sulfates from said de-oiled produced water by
      (i) mixing said de-oiled produced water with an amine solvent and magnesium sulfate or sulfate-rich mine drainage water to form precipitates comprising said radium and barium in the form of sulfates in a first precipitator unit;
      (ii) removing said precipitates from said de-oiled produced water and recovering at least most of remaining said amine solvent from said precipitates by a first filter equipped to recover said amine solvent to produce a first intermediate de-scaled produced water;
   (c) separating magnesium in the form of hydroxide from said first intermediate de-scaled produced water by
      (i) mixing said first intermediate de-scaled produced water with said amine solvent to form precipitates comprising said magnesium in the form of hydroxide in a second precipitator unit;
      (ii) removing said precipitates from said first intermediate de-scaled produced water and recovering at least most of remaining said amine solvent from said precipitates by a second filter equipped to recover said amine solvent to produce a second intermediate de-scaled produced water;
   (d) separating strontium in the form of hydroxide from said second intermediate de-scaled produced water by
      (i) mixing said second intermediate de-scaled produced water with a humic acid to form precipitates comprising said strontium in the form of hydroxide in a third precipitator unit;
      (ii) removing said precipitates from said second intermediate de-scaled produced water and recovering at least most of remaining said amine solvent from said precipitates by a third filter equipped to recover said amine solvent to produce de-scaled produced water;
   (e) recovering at least most of said amine solvent from said de-scaled produced water by a stripping unit to produce de-aerated produced water;
   (f) using said de-aerated produced water for hydro-fracturing; or
   (g) blending said de-aerated produced water with low salinity water to produce a blend stream for hydro-fracturing; or
   (h) de-salting said de-aerated produced water by a desalination method to produce water distillate and concentrate produced water;
   (i) de-salting said concentrate produced water by a thermal crystallizer to produce said water distillate and sodium-calcium chloride salt; or
   (j) de-salting said concentrate produced water by (i) mixing said concentrate produced water with said amine solvent to form precipitates comprising said sodium-calcium chloride salt in a fourth precipitator unit;

(ii) removing said precipitates from said concentrate produced water and recovering at least most of remaining said amine solvent from said precipitates by a fourth filter equipped to recover said amine solvent to produce decanted produced water; and (iii) recycling said decanted produced water by blending with said de-scaled produced water from step (d) and feeding the blend stream to said stripping unit in step (e).

2. The method of claim 1 wherein said amine solvent is selected from the group consisting of isopropylamine, propylamine, dipropylamine, diisopropylamine, ethylamine, diethylamine, methylamine, dimethylamine, and combinations thereof.

3. The method of claim 1 wherein said desalination method is selected from the group consisting of thermal vapor compression, mechanical vapor recompression, multi-effects, vacuum membrane distillation, direct contact membrane distillation, membrane osmotic distillation, multi-stage flash membrane distillation, reverse osmosis, forward osmosis, and combinations thereof.

4. A method to de-oil, de-scale and de-salt produced water, said method comprising the steps of:

(a) separating oil from said produced water by hydrophobic membranes to produce de-oiled produced water;

(b) separating radium and barium in the form of sulfates from said de-oiled produced water by (i) mixing said de-oiled produced water with an amine solvent and magnesium sulfate or sulfate-rich mine drainage water to form precipitates comprising said radium and barium in the form of sulfates in a first precipitator unit;

(ii) removing said precipitates from said de-oiled produced water and recovering at least most of remaining said amine solvent from said precipitates by a first filter equipped to recover said amine solvent to produce a first intermediate de-scaled produced water;

(c) separating magnesium in the form of hydroxide from said first intermediate de-scaled produced water by (i) mixing said first intermediate de-scaled produced water with said amine solvent to form precipitates comprising said magnesium in the form of hydroxide in a second precipitator unit;

(ii) removing said precipitates from said first intermediate de-scaled produced water and recovering at least most of remaining said amine solvent from said precipitates by a second filter equipped to recover said amine solvent to produce a second intermediate de-scaled produced water;

(d) separating calcium in the form of carbonate from said second intermediate de-scaled produced water by (i) mixing said second intermediate de-scaled produced water with sodium carbonate or a carbonate source to form precipitates comprising said calcium in the form of carbonate in a third precipitator unit;

(ii) removing said precipitates from said second intermediate de-scaled produced water and recovering at least most of remaining said amine solvent from said precipitates by a third filter equipped to recover said amine solvent to produce de-scaled produced water;

(e) recovering at least most of said amine solvent from said de-scaled produced water by a stripping unit to produce de-aerated produced water;

(f) using said de-aerated produced water for hydro-fracturing; or (g) blending said de-aerated produced water with low salinity water to produce a blend stream for hydro-fracturing; or (h) de-salting said de-aerated produced water by a desalination method to produce water distillate and concentrate produced water;

(i) de-salting said concentrate produced water by a thermal crystallizer to produce said water distillate and sodium-calcium chloride salt; or (j) de-salting said concentrate produced water by (i) mixing said concentrate produced water with an amine solvent to form precipitates comprising said sodium chloride salt in a fourth precipitator unit;

(ii) removing said precipitates from said concentrate produced water and recovering at least most of remaining said amine solvent from said precipitates by a fourth filter equipped to recover said amine solvent to produce decanted produced water; and (iii) recycling said decanted produced water by blending with said de-scaled produced water from step (d) and feeding the blend stream to said stripping unit in step (e).

5. The method of claim 4 wherein said amine solvent is selected from the group consisting of isopropylamine, propylamine, dipropylamine, diisopropylamine, ethylamine, diethylamine, methylamine, dimethylamine, and combinations thereof.

6. The method of claim 4 wherein said desalination method is selected from the group consisting of thermal vapor compression, mechanical vapor recompression, multi-effects, vacuum membrane distillation, direct contact membrane distillation, membrane osmotic distillation, multi-stage flash membrane distillation, reverse osmosis, forward osmosis, and combinations thereof.

7. A method to de-oil, de-scale and de-salt produced water, said method comprising the steps of:

(a) separating oil from said produced water by hydrophobic membranes to produce de-oiled produced water;

(b) separating radium and barium in the form of sulfates from said de-oiled produced water by (i) mixing said de-oiled produced water with an amine solvent and magnesium sulfate or sulfate-rich mine drainage water to form precipitates comprising said radium and barium in the form of sulfates in a first precipitator unit;

(ii) removing said precipitates from said de-oiled produced water and recovering at least most of remaining said amine solvent from said precipitates by a first filter equipped to recover said amine solvent to produce a first intermediate de-scaled produced water;

(c) separating magnesium in the form of hydroxide from said first intermediate de-scaled produced water by (i) mixing said first intermediate de-scaled produced water with said amine solvent to form precipitates comprising said magnesium in the form of hydroxide in a second precipitator unit;

(ii) removing said precipitates from said first intermediate de-scaled produced water and recovering at least most of remaining said amine solvent from said precipitates by a second filter equipped to recover said amine solvent to produce a second intermediate de-scaled produced water;
(d) separating calcium in the form of chloroaluminate or chloroferrate from said second intermediate de-scaled produced water by
  (i) mixing said second intermediate de-scaled produced water with said amine solvent and a source of aluminum or iron to form precipitates comprising said calcium chloroaluminate or calcium chloroferrate in a third precipitator unit;
  (ii) removing said precipitates from said second intermediate de-scaled produced water and recovering at least most of remaining said amine solvent from said precipitates by a third filter equipped to recover said amine solvent to produce de-scaled produced water;
(e) recovering at least most of said amine solvent from said de-scaled produced water by a stripping unit to produce de-aerated produced water;
(f) using said de-aerated produced water for hydro-fracturing; or
(g) blending said de-aerated produced water with low salinity water to produce a blend stream for hydro-fracturing; or
(h) de-salting said de-aerated produced water by a desalination method to produce water distillate and concentrate produced water;
(i) de-salting said concentrate produced water by a thermal crystallizer to produce said water distillate and sodium-calcium chloride salt; or
(j) de-salting said concentrate produced water by
  (i) mixing said concentrate produced water with an amine solvent to form precipitates comprising said sodium chloride salt in a fourth precipitator unit;
  (ii) removing said precipitates from said concentrate produced water and recovering at least most of remaining said amine solvent from said precipitates by a fourth filter equipped to recover said amine solvent to produce decanted produced water;
  (iii) recycling said decanted produced water by blending with said de-scaled produced water from step (d) and feeding the blend stream to said stripping unit in step (e).

8. The method of claim 7 wherein said amine solvent is selected from the group consisting of isopropylamine, propylamine, dipropylamine, diisopropylamine, ethylamine, diethylamine, methylamine, dimethylamine, and combinations thereof.

9. The method of claim 7 wherein said source of aluminum is selected from the group consisting of aluminum hydroxide, aluminum chlorohydrate, sodium aluminate, aluminum acetate, aluminum chloride, aluminum nitrate, and combinations thereof.

10. The method of claim 7 wherein said source of iron is selected from the group consisting of iron hydroxide, sodium ferrate, iron chloride, iron nitrate, and combinations thereof.

11. The method of claim 7 wherein said desalination method is selected from the group consisting of thermal vapor compression, mechanical vapor recompression, multi-effects, vacuum membrane distillation, direct contact membrane distillation, membrane osmotic distillation, multi-stage flash membrane distillation, reverse osmosis, forward osmosis, and combinations thereof.

12. A method to de-oil, de-scale and de-salt produced water, said method comprising the steps of:
(a) separating oil from said produced water by hydrophobic membranes to produce de-oiled produced water;
(b) separating radium and barium in the form of sulfates from said de-oiled produced water by
  (i) mixing said de-oiled produced water with an amine solvent and magnesium sulfate or sulfate-rich mine drainage water to form precipitates comprising said radium and barium in the form of sulfates in a first precipitator unit;
  (ii) removing said precipitates from said de-oiled produced water and recovering at least most of remaining said amine solvent from said precipitates by a first filter equipped to recover said amine solvent to produce a first intermediate de-scaled produced water;
(c) separating magnesium in the form of hydroxide from said first intermediate de-scaled produced water by
  (i) mixing said first intermediate de-scaled produced water with said amine solvent to form precipitates comprising said magnesium in the form of hydroxide in a second precipitator unit;
  (ii) removing said precipitates from said first intermediate de-scaled produced water and recovering at least most of remaining said amine solvent from said precipitates by a second filter equipped to recover said amine solvent to produce a second intermediate de-scaled produced water;
(d) separating calcium in the form of sulfoaluminate or sulfoferrate from said second intermediate de-scaled produced water by
  (i) mixing said second intermediate de-scaled produced water with sulfate-rich mine drainage water, a source of aluminum or iron, and said amine solvent to form precipitates comprising said calcium sulfoaluminate or calcium sulfoferrate in a third precipitator unit;
  (ii) removing said precipitates from said second intermediate de-scaled produced water and recovering at least most of remaining said amine solvent from said precipitates by a third filter equipped to recover said amine solvent to produce de-scaled produced water;
(e) recovering at least most of said amine solvent from said de-scaled produced water by a stripping unit to produce de-aerated produced water;
(f) using said de-aerated produced water for hydro-fracturing; or
(g) blending said de-aerated produced water with low salinity water to produce a blend stream for hydro-fracturing; or
(h) de-salting said de-aerated produced water by a desalination method to produce water distillate and concentrate produced water;
(i) de-salting said concentrate produced water by a thermal crystallizer to produce said water distillate and sodium-calcium chloride salt; or
(j) de-salting said concentrate produced water by
  (i) mixing said concentrate produced water with an amine solvent to form precipitates comprising said sodium chloride salt in a fourth precipitator unit;
  (ii) removing said precipitates from said concentrate produced water and recovering at least most of remaining said amine solvent from said precipitates by a fourth filter equipped to recover said amine solvent to produce decanted produced water;
  (iii) recycling said decanted produced water by blending with said de-scaled produced water from step (d) and feeding the blend stream to said stripping unit in step (e).

13. The method of claim 12 wherein said amine solvent is selected from the group consisting of isopropylamine, propylamine, dipropylamine, diisopropylamine, ethylamine, diethylamine, methylamine, dimethylamine, and combinations thereof.

14. The method of claim 12 wherein said source of aluminum is selected from the group consisting of aluminum hydroxide, aluminum chlorohydrate, sodium aluminate, aluminum acetate, aluminum chloride, aluminum nitrate, and combinations thereof.

15. The method of claim 12 wherein said source of iron is selected from the group consisting of iron hydroxide, sodium ferrate, iron chloride, iron nitrate, and combinations thereof.

16. The method of claim 12 wherein said desalination method is selected from the group consisting of thermal vapor compression, mechanical vapor recompression, multi-effects, vacuum membrane distillation, direct contact membrane distillation, membrane osmotic distillation, multi-stage flash membrane distillation, reverse osmosis, forward osmosis, and combinations thereof.

17. A method to de-oil, de-scale and de-salt produced water, said method comprising the steps of:
   (a) separating oil from said produced water by hydrophobic membranes to produce de-oiled produced water;
   (b) separating magnesium in the form of hydroxide from said de-oiled produced water by
      (i) mixing said de-oiled produced water with an amine solvent to form precipitates comprising said magnesium in the form of hydroxide in a first precipitator unit;
      (ii) removing said precipitates from said de-oiled produced water and recovering at least most of remaining said amine solvent from said precipitates by a first filter equipped to recover said amine solvent to produce a first intermediate de-scaled produced water;
   (c) separating calcium in the form of chloroaluminate or chloroferrate from said first intermediate de-scaled produced water by
      (i) mixing said first intermediate de-scaled produced water with said amine solvent and a source of aluminum or iron to form precipitates comprising said calcium chloroaluminate or calcium chloroferrate in a second precipitator unit;
      (ii) removing said precipitates from said first intermediate de-scaled produced water and recovering at least most of remaining said amine solvent from said precipitates by a second filter equipped to recover said amine solvent to produce a second intermediate de-scaled produced water;
   (d) separating radium and barium in the form of sulfates from said second intermediate de-scaled produced water by
      (i) mixing said second intermediate de-scaled produced water with magnesium sulfate or sulfate-rich mine drainage water to form precipitates comprising said radium and barium in the form of sulfates in a third precipitator unit;
      (ii) removing said precipitates from said second intermediate de-scaled produced water and recovering at least most of remaining said amine solvent from said precipitates by a third filter equipped to recover said amine solvent to produce de-scaled produced water;
   (e) recovering at least most of said amine solvent from said de-scaled produced water by a stripping unit to produce de-aerated produced water;
   (f) using said de-aerated produced water for hydro-fracturing; or
   (g) blending said de-aerated produced water with low salinity water to produce a blend stream for hydro-fracturing; or
   (h) de-salting said de-aerated produced water by a desalination method to produce water distillate and concentrate produced water;
   (i) de-salting said concentrate produced water by a thermal crystallizer to produce said water distillate and sodium-calcium chloride salt; or
   (j) de-salting said concentrate produced water by
      (i) mixing said concentrate produced water with the amine solvent to form precipitates comprising said sodium chloride salt in a fourth precipitator unit;
      (ii) removing said precipitates from said concentrate produced water and recovering at least most of remaining said amine solvent from said precipitates by a fourth filter equipped to recover said amine solvent to produce decanted produced water;
      (iii) recycling said decanted produced water by blending with said de-scaled produced water from step (d) and feeding the blend stream to said stripping unit in step (e).

18. The method of claim 17 wherein said amine solvent is selected from the group consisting of isopropylamine, propylamine, dipropylamine, diisopropylamine, ethylamine, diethylamine, methylamine, dimethylamine, and combinations thereof.

19. The method of claim 17 wherein said source of aluminum is selected from the group consisting of aluminum hydroxide, aluminum chlorohydrate, sodium aluminate, aluminum acetate, aluminum chloride, aluminum nitrate, and combinations thereof.

20. The method of claim 17 wherein said source of iron is selected from the group consisting of iron hydroxide, sodium ferrate, iron chloride, iron nitrate, and combinations thereof.

21. The method of claim 17 wherein said desalination method is selected from the group consisting of thermal vapor compression, mechanical vapor recompression, multi-effects, vacuum membrane distillation, direct contact membrane distillation, membrane osmotic distillation, multi-stage flash membrane distillation, reverse osmosis, forward osmosis, and combinations thereof.

22. A method to de-oil, de-scale and de-salt produced water, said method comprising the steps of:
   (a) separating oil from said produced water by hydrophobic membranes to produce de-oiled produced water;
   (b) separating magnesium in the form of hydroxide from said de-oiled produced water by
      (i) mixing said de-oiled produced water with an amine solvent to form precipitates comprising said magnesium in the form of hydroxide in a first precipitator unit;
      (ii) removing said precipitates from said de-oiled produced water and recovering at least most of remaining said amine solvent from said precipitates by a first filter equipped to recover said amine solvent to produce a first intermediate de-scaled produced water;
   (c) separating calcium in the form of chloroaluminate or chloroferrate from said first intermediate de-scaled produced water by
      (i) mixing said first intermediate de-scaled produced water with said amine solvent and a source of aluminum or iron to form precipitates comprising said calcium chloroaluminate or calcium chloroferrate in a second precipitator unit;

(ii) removing said precipitates from said first intermediate de-scaled produced water and recovering at least most of remaining said amine solvent from said precipitates by a second filter equipped to recover said amine solvent to produce a second intermediate de-scaled produced water;

(d) separating radium and barium in the form of carbonates from said second intermediate de-scaled produced water by
(i) mixing said second intermediate de-scaled produced water with sodium carbonate or a carbonate source to form precipitates comprising said radium and barium in the form of carbonates in a third precipitator unit;
(ii) removing said precipitates from said second intermediate de-scaled produced water and recovering at least most of remaining said amine solvent from said precipitates by a third filter equipped to recover said amine solvent to produce de-scaled produced water;

(e) recovering at least most of said amine solvent from said de-scaled produced water by a stripping unit to produce de-aerated produced water;

(f) using said de-aerated produced water for hydro-fracturing; or (g) blending said de-aerated produced water with low salinity water to produce a blend stream for hydro-fracturing; or (h) de-salting said de-aerated produced water by a desalination method to produce water distillate and concentrate produced water;

(i) de-salting said concentrate produced water by a thermal crystallizer to produce said water distillate and sodium-calcium chloride salt; or (j) de-salting said concentrate produced water by
(i) mixing said concentrate produced water with an amine solvent to form precipitates comprising said sodium chloride salt in a fourth precipitator unit;
(ii) removing said precipitates from said concentrate produced water and recovering at least most of remaining said amine solvent from said precipitates by a fourth filter equipped to recover said amine solvent to produce decanted produced water;
(iii) recycling said decanted produced water by blending with said de-scaled produced water from step (d) and feeding the blend stream to said stripping unit in step (e).

23. The method of claim 22 wherein said amine solvent is selected from the group consisting of isopropylamine, propylamine, dipropylamine, diisopropylamine, ethylamine, diethylamine, methylamine, dimethylamine, and combinations thereof.

24. The method of claim 22 wherein said source of aluminum is selected from the group consisting of aluminum hydroxide, aluminum chlorohydrate, sodium aluminate, aluminum acetate, aluminum chloride, aluminum nitrate, and combinations thereof.

25. The method of claim 22 wherein said source of iron is selected from the group consisting of iron hydroxide, sodium ferrate, iron chloride, iron nitrate, and combinations thereof.

26. The method of claim 22 wherein said desalination method is selected from the group consisting of thermal vapor compression, mechanical vapor recompression, multi-effects, vacuum membrane distillation, direct contact membrane distillation, membrane osmotic distillation, multi-stage flash membrane distillation, reverse osmosis, forward osmosis, and combinations thereof.

27. A method to de-oil, de-scale and de-salt produced water, said method comprising the steps of:
(a) separating oil from said produced water by hydrophobic membranes to produce de-oiled produced water;
(b) separating magnesium in the form of hydroxide from said de-oiled produced water by
(i) mixing said de-oiled produced water with an amine solvent to form precipitates comprising said magnesium in the form of hydroxide in a first precipitator unit;
(ii) removing said precipitates from said de-oiled produced water and recovering at least most of remaining said amine solvent from said precipitates by a first filter equipped to recover said amine solvent to produce a first intermediate de-scaled produced water;
(c) separating radium and barium in the form of sulfates from said first intermediate de-scaled produced water by
(i) mixing said first intermediate de-scaled produced water with sulfate-rich mine drainage water to form precipitates comprising said radium and barium in the form of sulfates in a second precipitator unit;
(ii) removing said precipitates from said first intermediate de-scaled produced water and recovering at least most of remaining said amine solvent from said precipitates by a second filter equipped to recover said amine solvent to produce a second intermediate de-scaled produced water;
(d) separating calcium in the form of sulfoaluminate or sulfoferrate from said second intermediate de-scaled produced water by
(i) mixing said second intermediate de-scaled produced water with said amine solvent and a source of aluminum or iron to form precipitates comprising said calcium sulfoaluminate or calcium sulfoferrate in a third precipitator unit;
(ii) removing said precipitates from said second intermediate de-scaled produced water and recovering at least most of remaining said amine solvent from said precipitates by a third filter equipped to recover said amine solvent to produce de-scaled produced water;
(e) recovering at least most of said amine solvent from said de-scaled produced water by a stripping unit to produce de-aerated produced water;
(f) using said de-aerated produced water for hydro-fracturing; or
(g) blending said de-aerated produced water with low salinity water to produce a blend stream for hydro-fracturing; or
(h) de-salting said de-aerated produced water by a desalination method to produce water distillate and concentrate produced water;
(i) de-salting said concentrate produced water by a thermal crystallizer to produce said water distillate and sodium-calcium chloride salt; or
(j) de-salting said concentrate produced water by
(i) mixing said concentrate produced water with an amine solvent to form precipitates comprising said sodium chloride salt in a fourth precipitator unit;
(ii) removing said precipitates from said concentrate produced water and recovering at least most of remaining said amine solvent from said precipitates by a fourth filter equipped to recover said amine solvent to produce decanted produced water;

(iii) recycling said decanted produced water by blending with said de-scaled produced water from step (d) and feeding the blend stream to said stripping unit in step (e).

28. The method of claim 27 wherein said amine solvent is selected from the group consisting of isopropylamine, propylamine, dipropylamine, diisopropylamine, ethylamine, diethylamine, methylamine, dimethylamine, and combinations thereof.

29. The method of claim 27 wherein said source of aluminum is selected from the group consisting of aluminum hydroxide, aluminum chlorohydrate, sodium aluminate, aluminum acetate, aluminum chloride, aluminum nitrate, and combinations thereof.

30. The method of claim 27 wherein said source of iron is selected from the group consisting of iron hydroxide, sodium ferrate, iron chloride, iron nitrate, and combinations thereof.

31. The method of claim 27 wherein said desalination method is selected from the group consisting of thermal vapor compression, mechanical vapor recompression, multi-effects, vacuum membrane distillation, direct contact membrane distillation, membrane osmotic distillation, multistage flash membrane distillation, reverse osmosis, forward osmosis, and combinations thereof.

32. A method to de-oil, de-scale and de-salt produced water, said method comprising the steps of:
 (a) separating oil from said produced water by hydrophobic membranes to produce de-oiled produced water;
 (b) separating radium and barium in the form of sulfates, and magnesium and strontium in the form of hydroxides from said de-oiled produced water by
  (i) mixing said de-oiled produced water with an amine solvent and a humic acid to form precipitates comprising said radium and barium in the form of sulfates and said magnesium and strontium in the form of hydroxides in a first precipitator unit;
  (ii) removing said precipitates from said de-oiled produced water and recovering at least most of remaining said amine solvent from said precipitates by a first filter equipped to recover said amine solvent to produce de-scaled produced water;
 (c) recovering at least most of said amine solvent from said de-scaled produced water by a stripping unit to produce de-aerated produced water;
 (d) using said de-aerated produced water for hydrofracturing; or
 (e) blending said de-aerated produced water with low salinity water to produce a blend stream for hydrofracturing; or
 (f) de-salting said de-aerated produced water by a desalination method to produce water distillate and concentrate produced water;
 (g) de-salting said concentrate produced water by a thermal crystallizer to produce said water distillate and sodium-calcium chloride salt; or
 (h) de-salting said concentrate produced water by
  (i) mixing said concentrate produced water with an amine solvent to form precipitates comprising said sodium-calcium chloride salt in a second precipitator unit;
  (ii) removing said precipitates from said concentrate produced water and recovering at least most of remaining said amine solvent from said precipitates by a second filter equipped to recover said amine solvent to produce decanted produced water;
  (iii) recycling said decanted produced water by blending with said de-scaled produced water from step (b) and feeding the blend stream to said stripping unit in step (c).

33. The method of claim 32 wherein said amine solvent is selected from the group consisting of isopropylamine, propylamine, dipropylamine, diisopropylamine, ethylamine, diethylamine, methylamine, dimethylamine, and combinations thereof.

34. The method of claim 32 wherein said desalination method is selected from the group consisting of thermal vapor compression, mechanical vapor recompression, multi-effects, vacuum membrane distillation, direct contact membrane distillation, membrane osmotic distillation, multistage flash membrane distillation, reverse osmosis, forward osmosis, and combinations thereof.

* * * * *